(12) United States Patent
Zimmermann et al.

(10) Patent No.: US 12,682,214 B2
(45) Date of Patent: Jul. 14, 2026

(54) COUPLING MULTIPLE ARTIFICIALLY LEARNING UNITS WITH A PROJECTION LEVEL

(71) Applicants: FRAUNHOFER-GESELLSCHAFT ZUR FÖRDERUNG DER ANGEWANDTEN FORSCHUNG E.V., Munich (DE); UNIVERSITÄT DES SAARLANDES, Saarbrücken (DE)

(72) Inventors: Heiko Zimmermann, Sulzbach (DE); Günter Fuhr, Berlin (DE); Antonie Fuhr, Potsdam (DE)

(73) Assignees: Fraunhofer-Gesellschaft Zur Förderung Der Angewandten Forschung E.V, Munich (DE); Universität Des Saarlandes, Saarbrucken (DE)

( * ) Notice: Subject to any disclaimer, the term of this patent is extended or adjusted under 35 U.S.C. 154(b) by 1173 days.

(21) Appl. No.: 17/612,768

(22) PCT Filed: Mar. 9, 2020

(86) PCT No.: PCT/EP2020/056274
§ 371 (c)(1),
(2) Date: Nov. 19, 2021

(87) PCT Pub. No.: WO2020/233851
PCT Pub. Date: Nov. 26, 2020

(65) Prior Publication Data
US 2022/0292331 A1      Sep. 15, 2022

(30) Foreign Application Priority Data
May 21, 2019     (EP) ..................................... 19175786

(51) Int. Cl.
*G06N 3/045*          (2023.01)
*G06N 3/049*          (2023.01)
(Continued)

(52) U.S. Cl.
CPC ............. *G06N 3/045* (2023.01); *G06N 3/049* (2013.01); *G06N 3/08* (2013.01); *G06N 3/084* (2013.01)

(58) Field of Classification Search
CPC .......... G06N 3/045; G06N 3/049; G06N 3/08; G06N 3/084
See application file for complete search history.

(56) References Cited

U.S. PATENT DOCUMENTS

| | | | |
|---|---|---|---|
| 5,155,801 A | 10/1992 | Lincoln | |
| 5,659,666 A | 8/1997 | Thaler | |
| (Continued) | | | |

FOREIGN PATENT DOCUMENTS

| | | |
|---|---|---|
| CN | 1242848 A | 1/2000 |
| CN | 105637540 A | 6/2016 |
| (Continued) | | |

OTHER PUBLICATIONS

Guo, Yanming, et al. "CNN-RNN: a large-scale hierarchical image classification framework." Multimedia tools and applications 77.8 (2018): 10251-10271. (Year: 2018).*

(Continued)

*Primary Examiner* — Andrew T Chiusano
(74) *Attorney, Agent, or Firm* — Alston & Bird LLP

(57) ABSTRACT

Provided are methods in a system of at least a second and a third artificial intelligence unit, comprising: inputting first input values to at least one second artificial intelligence unit, and obtaining output values based on the input values from the at least one second artificial intelligence unit; at least temporarily storing situation data, the situation data comprising first input values and/or second output values of the at least one second unit; using the situation data as input values of the third artificial intelligence unit, the third artificial intelligence unit generating third output values in response to the input values; and checking whether the second output values of the at least one second unit satisfy (Continued)

one or more predetermined conditions based on the third output values. Also provided is a system for carrying out such a method.

17 Claims, 8 Drawing Sheets

(51) Int. Cl.
 G06N 3/08 (2023.01)
 G06N 3/084 (2023.01)

(56) References Cited

U.S. PATENT DOCUMENTS

| | | | | |
|---|---|---|---|---|
| 7,613,675 | B2 * | 11/2009 | Hawkins | G06N 3/049 |
| | | | | 706/55 |
| 8,775,341 | B1 | 7/2014 | Commons | |
| 10,242,665 | B1 | 3/2019 | Abeloe | |
| 2006/0095199 | A1 * | 5/2006 | Lagassey | H04L 65/61 |
| | | | | 340/933 |
| 2014/0324747 | A1 | 10/2014 | Crowder et al. | |
| 2016/0019457 | A1 | 1/2016 | Van Der Made | |
| 2016/0328646 | A1 | 11/2016 | Lin et al. | |
| 2017/0228643 | A1 * | 8/2017 | Kurach | G06F 3/0653 |
| 2017/0278018 | A1 | 9/2017 | Mnih et al. | |
| 2018/0089543 | A1 * | 3/2018 | Merler | G06F 18/2415 |
| 2019/0012611 | A1 * | 1/2019 | Matsumura | G06N 20/00 |
| 2019/0050736 | A1 | 2/2019 | Han et al. | |
| 2019/0102658 | A1 * | 4/2019 | Wang | G06N 3/08 |
| 2019/0236482 | A1 | 8/2019 | Desjardins et al. | |
| 2021/0012194 | A1 * | 1/2021 | Laskaridis | G06N 3/063 |
| 2022/0019874 | A1 | 1/2022 | Pfeil et al. | |

FOREIGN PATENT DOCUMENTS

| | | | |
|---|---|---|---|
| CN | 107636697 | A | 1/2018 |
| CN | 109690576 | A | 4/2019 |
| GB | 2336227 | A | 10/1999 |
| GB | 2337227 | A | 10/1999 |
| WO | WO 2018/208939 | A1 | 11/2018 |
| WO | WO-2018/220566 | A1 | 12/2018 |

OTHER PUBLICATIONS

Jung, Hyunwoo, et al. "Learning what to remember: Long-term episodic memory networks for learning from streaming data." arXiv preprint arXiv:1812.04227 (2018). (Year: 2018).*

International Search Report for PCT/EP2020/056274 (ISA/EP) mailed Jun. 16, 2020 with English translation (7 pages).
Written Opinion for PCT/EP2020/056274 (ISA/EP) mailed Jun. 16, 2020 (6 pages).
International Preliminary Report on Patentability for PCT/EP2020/056274 (IPEA/EP) mailed Aug. 31, 2021 (6 pages).
Yan Zhicheng et al., *HD-CNN: Hierarchical Deep Convolutional Neural Networks for Large Scale Visual Recognition*, 2015 IEEE International Conference on Computer Vision (ICCV).
Zhicheng Yan, *"Hierarchical Deep Convolutional Neural Networks for Large Scale Visual Recognition,"* IEEE, Feb. 18, 2016.
1st Office Action with Search Report for China Patent Application No. 202080047725.X dated Oct. 30, 2024, w/English translation (17 pages).
$2^{nd}$ Office Action for China Patent Application No. 202080047725.X dated Jun. 11, 2025, w/English translation.
Seach Report for China Patent Application No. 202080047725.X w/English translation (4 pages).
Ha, David et al., Hypernetworks, <arXiv:1609.09106v4 [CS.1g]> Dec. 1, 2016 (29 pages).
Hettinger, Chris et al.; "Forward Thinking: Building and Training Neural Networks One Layer at a Time"; 2017; arXiv; 1-9 (Year: 2017).
International Preliminary Report on Patentability for PCT/EP2020/056271 (IPEA/EP) with English translation dated Aug. 31, 2021 (24 pages).
International Search Report for PCT/EP2020/056271 (ISA/EP) mailed Jun. 29, 2020 with English translation (6 pages).
Liu, Dianjing et al.; "Training Deep Neural Networks for the Inverse Design of Nanophotonic Structures"; 2018; ACS Photonics 2018 5; 1365-1369 (Year: 2018).
Notice of Allowance (Notice of Registration Procedure) for China Patent Application No. 202080048132.5 dated Jun. 4, 2025, w/English translation (8 pages).
Office action for European Patent Application No. 20709201.6 dated Nov. 19, 2024 (9 pages).
Written Opinion for PCT/EP2020/056271 (ISA/EP) mailed Jun. 29, 2020 (6 pages).
Zhang, Xiang et al.; "CrescendoNet: A New Deep Convolutional Neural Network with Ensemble Behavior"; 2018 17th IEEE International Conference on Machine Learning and Applications; 311-317 (Year: 2018).
Zhu, Xinqi; "B-CNN: Branch Convolutional Neural Network for Hierarchical Classification"; 2017; arXiv; 1-9 (Year: 2017).
Non-Final Rejection Mailed on Feb. 24, 2026 for U.S. Appl. No. 17/612,746, 29 page(s).
Perumallapalli, Ravi Kumar et al.; "Autonomous Vehicles: Real-Time AI for Safer Transportation Networks"; Apr. 2011; 2011 IJCSPUB vol. 1, issue 2; 61-69 (Year: 2011).

* cited by examiner

COUPLING MULTIPLE ARTIFICIALLY LEARNING UNITS WITH A PROJECTION LEVEL

CROSS-REFERENCE TO RELATED APPLICATIONS

The present application is a national phase entry of International Application No. PCT/EP2020/056274, filed Mar. 9, 2020, which claims priority to European Application No. 19175786.3, filed May 21, 2019, which are incorporated herein by reference in their entirety.

The present invention relates to a system of two or more coupled artificial intelligence units.

PRIOR ART

Artificial intelligence now plays an increasing role in countless areas of application. This is initially understood to mean any automation of intelligent behavior and machine learning. However, such systems are usually intended and trained for special tasks. This form of artificial intelligence (AI) is often referred to as "weak AI" and is essentially based on the application of computations and algorithms to simulate intelligent behavior in a fixed domain. Examples include systems that are able to recognize certain patterns, such as safety systems in vehicles, or that can learn and implement certain rules, such as in chess. At the same time, these systems are essentially useless in other domains and must be completely retrained for other applications or even trained using completely different approaches.

For the practical implementation of such artificial intelligence units, neural networks are used, among other things. In principle, these networks replicate the functioning of biological neurons on an abstract level. There are several artificial neurons or nodes that are connected to each other and can receive, process and transmit signals to other nodes. For each node, for example, functions, weightings and threshold values are defined that determine whether and to what extent a signal is passed on to a node.

Usually, the nodes are considered in layers, so that each neural network has at least one output layer. Before that, other layers may be present as so-called hidden layers, so that a multilayer network is formed. The input values or features can also be considered as layers. The connections between the nodes of the different layers are called edges, and these are usually assigned a fixed processing direction. Depending on the network topology, it may be specified which node of a layer is linked to which node of the following layer. In this case, all nodes can be connected, but, for example, due to a learned weighting with the value 0, a signal cannot be processed further via a specific node.

The processing of signals in the neural network can be described by various functions. In the following, this principle is described for a single neuron or node of a neural network. From the several different input values reaching a node, a network input is formed by a propagation function (also input function). Often this propagation function comprises a simple weighted sum, where for each input value an associated weight is given. In principle, however, other propagation functions are also possible. In this case, the weights can be specified as a weight matrix for the network.

An activation function, which can be dependent on a threshold value, is applied to the network input of a node formed in this way. This function represents the relationship between the network input and the activity level of a neuron. Various activation functions are known, for example, simple binary threshold functions whose output is thus zero below the threshold and identity above the threshold; sigmoid functions; or piecewise linear functions with a given slope. These functions are specified in the design of a neural network. The output of the activation function forms the activation state. Optionally, an additional output function may be specified, which is applied to the output of the activation function and determines the final output value of the node. Often, however, the result of the activation function is simply passed directly as the output value here, i.e. the identity is used as the output function. Depending on the nomenclature used, the activation function and the output function can also be combined as a transfer function.

The output values of each node are then passed on to the next layer of the neural network as input values for the respective nodes of the layer, where the corresponding steps are repeated for processing with the respective functions and weights of the node. Depending on the topology of the network, there may also be backward edges to previous layers or back to the outputting layer, resulting in a recurrent network.

In contrast, the weights with which each of the input values are weighted can be changed by the network, thus adjusting the output values and functioning of the entire network, which is considered as the "learning" of a neural network. For this purpose, an error backpropagation in the network is usually used, i.e. a comparison of the output values with expected values and a use of the comparison for the adaptation of the input values with the goal of error minimization. Error feedback can then be used to adjust various parameters of the network accordingly, such as the step size (learning rate) or the weights of the input values at the nodes. Likewise, the input values can also be re-evaluated.

The networks can then be trained in a training mode. The learning strategies used are also decisive for the possible applications of a neural network. In particular, the following variants are distinguished:

In supervised learning, an input pattern or training data set is given and the output of the network is compared with the expected value.

Unsupervised learning leaves the finding of correlations or rules to the system, so that only the patterns to be learned are specified. An intermediate variant is partially supervised learning, in which data sets without predefined classifications can also be used.

In reinforced learning or Q-learning, an agent is created that can receive rewards and punishments for actions, and based on this, tries to maximize rewards received and thus adapt its behavior.

An important application of neural networks is the classification of input data or inputs into certain categories or classes, i.e. the recognition of correlations and assignments. The classes can be trained on the basis of known data and be at least partially predefined, or they can be developed or learned independently by a network.

The basic operation and further specific details of such neural networks are well known in the field, for example from R. Schwaiger, J. Steinwender, Neuronale Netze programmieren mit Python, Rheinwerk Computing, Bonn 2019.

A universally applicable AI system that is not trained for only one special task would lead to high-dimensional spaces and thus require exponentially increasing training and test data sets. Real-time responses thus quickly become impossible. Therefore, it is generally tried to reduce the dimensionality and complexity of such systems. Different approaches are being pursued. For example, the complexity can be reduced by linking data sets, reducing the degrees of freedom and/or by feeding known knowledge into a system. As another approach, correlated data or interdependent data sets can be at least partially separated, for example by methods such as Principal Component Analysis. By applying filtering methods to the features, data that do not stand out or stand out negatively when training a network can be eliminated, for example, by applying statistical tests such as the chi-square test or others. Finally, the selection of the training data itself can be done as an optimization problem in an AI network. This involves combining the training data in such a way that it can train a new network as quickly and as well as possible.

More advanced approaches include so-called "Convolutional Neural Networks", which apply convolutions in at least one layer of a multilayer fully connected network instead of simple matrix transformations. For this purpose, for example, the so-called "deep-dream" method is known, especially in the field of image recognition, in which the weights are left optimal in a trained network, but instead the input values (e.g., an input image) are modified as a feedback loop depending on the output value. Thus, for example, what the system thinks it can identify is faded in. The name refers to the fact that dream-like images are created in the process. In this way, internal processes of the neural network and their direction can be traced.

It is obvious that these methods still show great differences to human intelligence. Although the databases, text files, images and audio files can in principle be compared to how facts, language, speech logic, sounds, images and event sequences are also stored and processed in the brain, human intelligence, for example, differs significantly in that it links all this data in the context of feelings and unconscious "soft" categorizations.

DISCLOSURE OF THE INVENTION

According to the invention, a method in a system of coupled artificial intelligence units and a system which carries out this method with the features of the independent claims are proposed. Advantageous embodiments are the subject of the dependent claims and the following description.

In particular, a method is proposed in a system of at least a second and a third artificial intelligence unit, comprising: inputting first input values to said at least a second artificial intelligence unit, and obtaining output values based on said input values from said at least a second artificial intelligence unit; at least temporarily storing situation data, said situation data comprising at least one of first input values and second output values from said at least a second unit; and using the situation data as input values of the third artificial intelligence unit, the third artificial intelligence unit generating third output values in response to the input values; and checking whether the second output values of the at least one second unit satisfy one or more predetermined conditions based on the third output values. In this manner, one of the units may act as a validating unit that evaluates, monitors, or otherwise validates solutions from one or more other units in the system, particularly for compliance with certain constraints that may be predetermined or formed in the validating unit.

Thereby, the second output values may be discarded if the check shows that the output values do not meet at least one predetermined condition. Additionally or alternatively, the method may further comprise deciding whether to permanently store at least part of the current situation data, and transferring the situation data to be permanently stored to a long-term memory.

Depending on the embodiment, deciding whether to permanently store at least a portion of the current situation data may depend on the result of checking whether the second output values satisfy one or more predetermined conditions.

Optionally, storing the situation data may further comprise storing time information for the input values and/or output values, wherein it is possible, for example, that the time information comprises one or more time intervals to which one or more input values and/or output values are assigned. In this way, input values and/or output values can be used to form a temporal sequence or sequences which can be processed together and allow classification in relation to situations, events or other data.

A time period may be predetermined for which the situation data is stored at least temporarily, and at least one of the artificial intelligence units may be arranged to set or change the time period. For example, this may be the third unit, which may change the time span based on its output values or other evaluations, but it may also be possible for other artificial intelligence units of the system to shorten or lengthen a predetermined time span. Similarly, the time span may be specified flexibly, or may be sized differently for different data.

According to exemplary embodiments, the method further comprises comparing current output values of the at least one second unit with output values stored in the situation data. The comparison may be performed, for example, by the third unit. Such a comparison allows recourse to previous output values, i.e. previous solutions, optionally together with the associated input values, and may thus emulate experiential learning. Furthermore, a comparison of output values may be used to evaluate the quality of the output values or to determine whether a current solution is worse or better at satisfying one or more predetermined conditions.

The system may further comprise a first artificial intelligence unit, wherein the first input values may then also be input to the first artificial intelligence unit, and first output values of the first artificial intelligence unit may be output. Based on the output values of the first artificial intelligence unit and/or the third artificial intelligence unit, one or more modulation functions may then be formed, which may subsequently be applied to one or more parameters of the second artificial intelligence unit, the one or more parameters influencing the processing of input values and the obtaining of output values in the second artificial intelligence unit. Thus, the processing of input values in the second unit can be influenced without directly specifying the parameters themselves.

In certain embodiments, each of the artificial intelligence units may have a classification memory associated therewith, wherein each of the artificial intelligence units, when generating the output values, classifies the input values into one or more classes stored in the classification memory, wherein the classes are each structured in one or more dependent levels, and wherein a number of the classes and/or the levels in a classification memory of the first or the third artificial intelligence unit is less than a number of the classes and/or the levels in a classification memory of the second artificial intelligence unit. The asymmetry between the memories of the different units may ensure that each unit performs a specific task. For example, the first unit may be implemented as a fast or coarse categorizing unit, while the second unit, which has a much more complex memory, may be implemented as a deep analyzing unit.

In any embodiment, one or more of the artificial intelligence units may comprise a neural network. It is also possible that all of the artificial intelligence units of a system are neural networks. However, depending on the nature of the functions performed, one or more of the units may implement other forms of machine learning. For example, the first and second units could be implemented as neural networks, while the third unit does not form a neural network.

The input values input to at least the first and/or second units may be measurements sensed by one or more sensors, data sensed by a user interface, data retrieved from a memory, data received via a communication interface, and/ or data output by a computing unit, or any combination of these possibilities.

A system is further proposed comprising two or more artificial intelligence units and means for sensing input values input as first input values to a first and/or a second artificial intelligence unit (e.g. said sensors, interfaces or others); the system further comprising at least one user interface for outputting total output values to a user, said total output values being formed based on output values from one or more of said artificial intelligence units, and wherein the system is adapted to perform a method using any combination of the method steps described above.

Further advantages and embodiments of the invention will be apparent from the description and the accompanying drawings.

It should be noted that the designations as "first", "second" and "third" units are used herein in the sense of referencing identifiers for units having particular functions as described in each context, and are not necessarily to be understood as ordinal numbers. In particular, for example, in a system consisting of only two artificial intelligence units, for consistency, these two units may be referred to as the "second" and "third" units.

It is understood that the above features, and those to be explained below, may be used not only in the combination indicated in each case, but also in other combinations or alone, without departing from the scope of the present invention.

The invention is illustrated schematically with reference to examples of embodiments shown in the drawings, and is described below with reference to the drawings.

FIGURE DESCRIPTION

FIG. 1 shows a combination of two artificial intelligence units coupled together;

FIG. 2 schematically shows various exemplary modulation functions;

Figure 1:
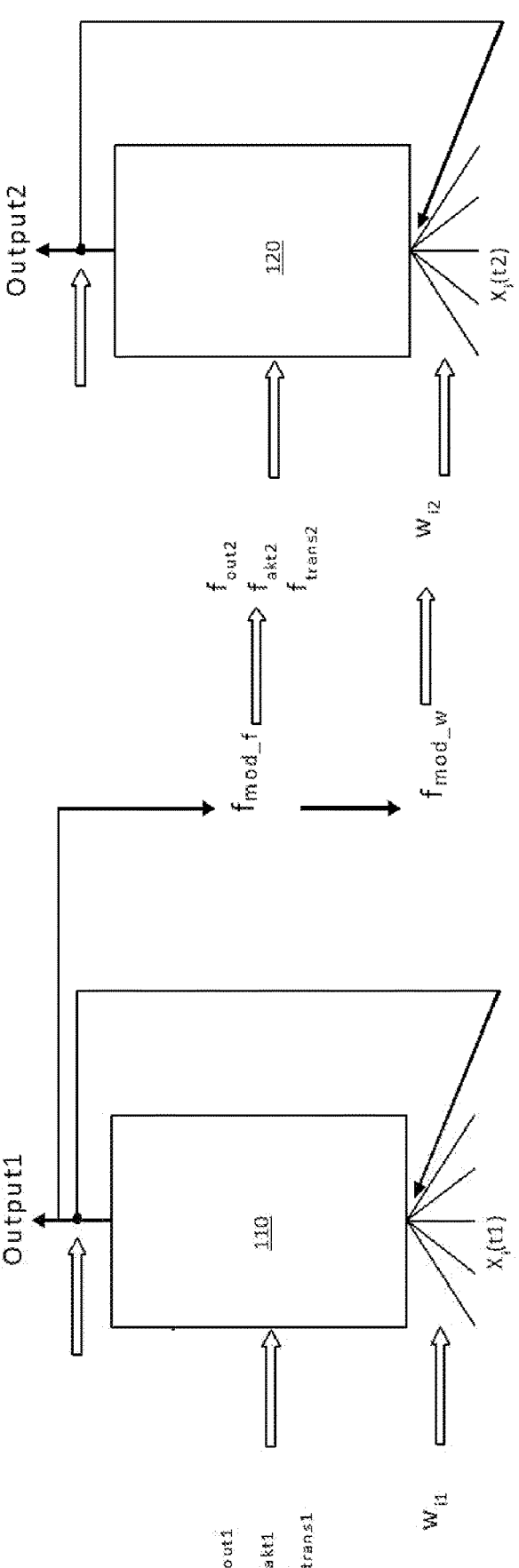
Figure 5:
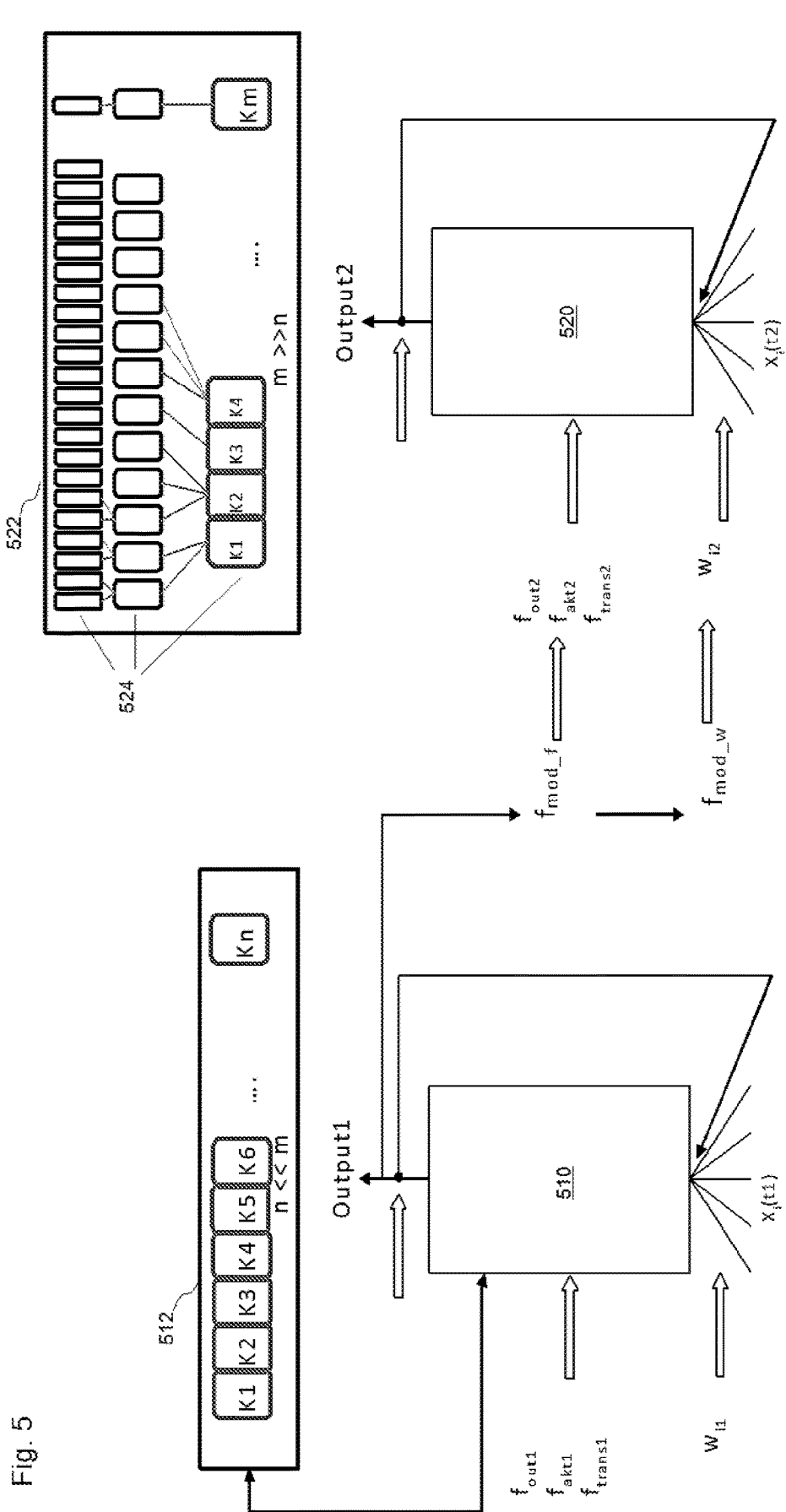
Figure 6:
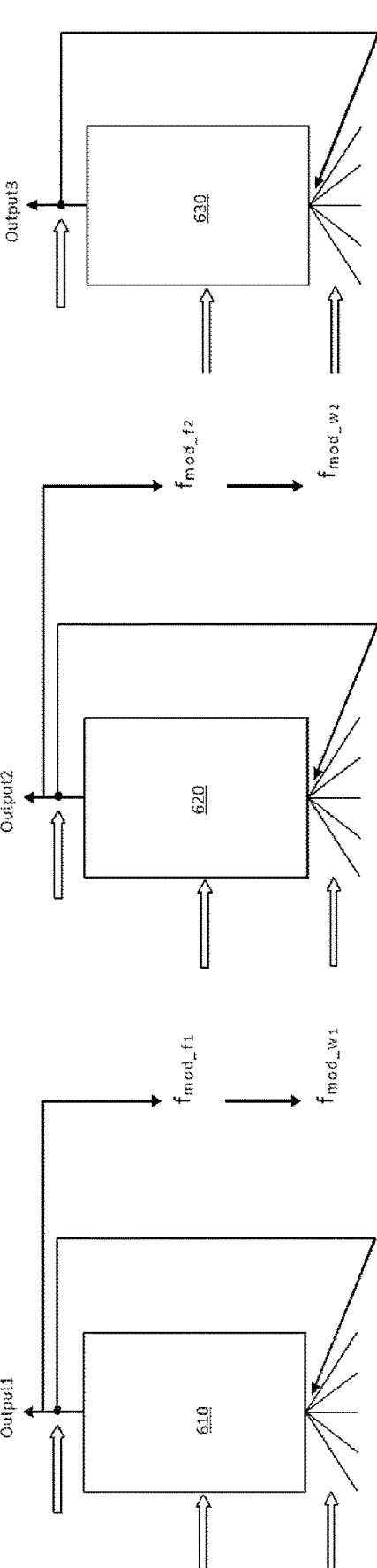
Figure 7:
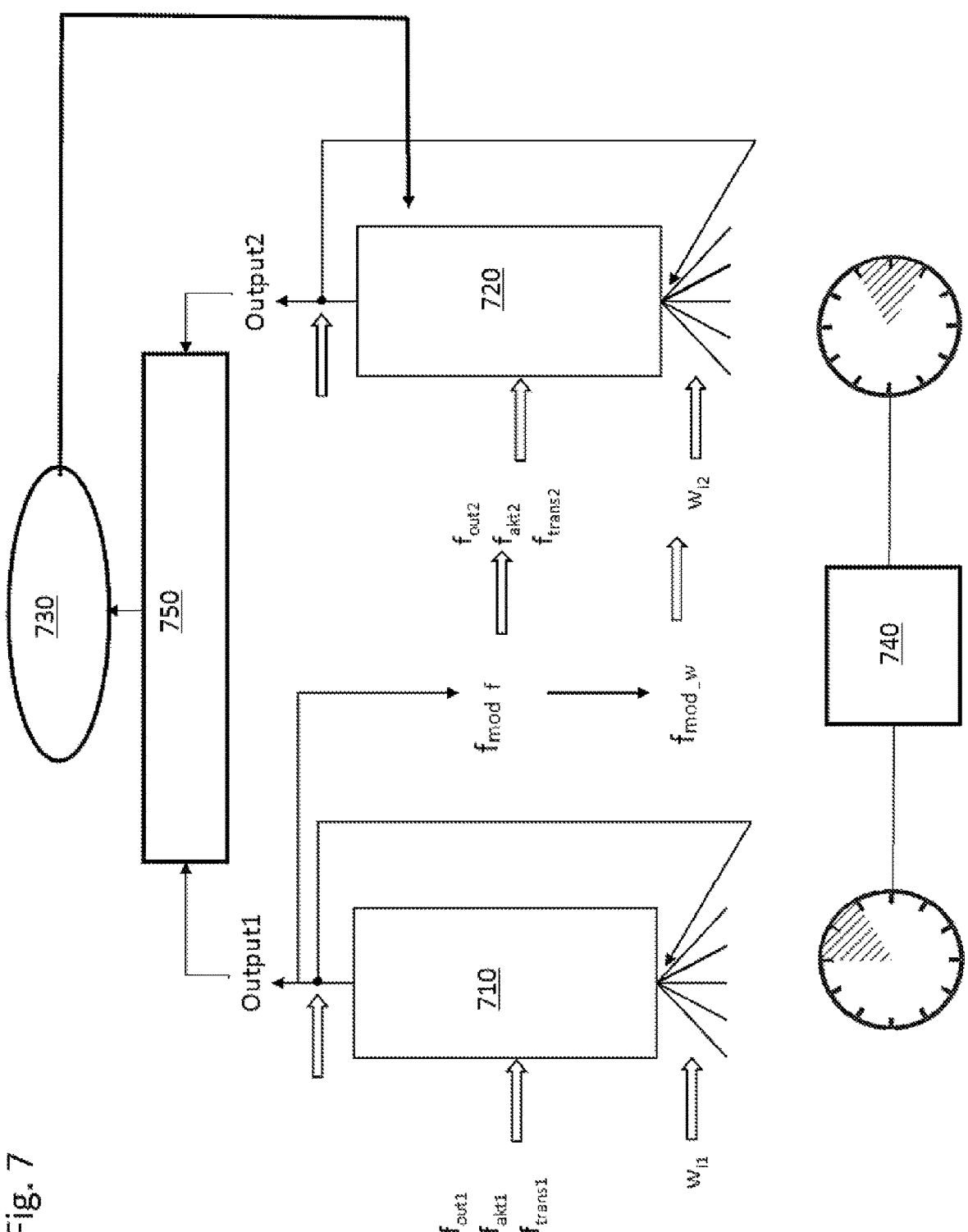
Figure 8:
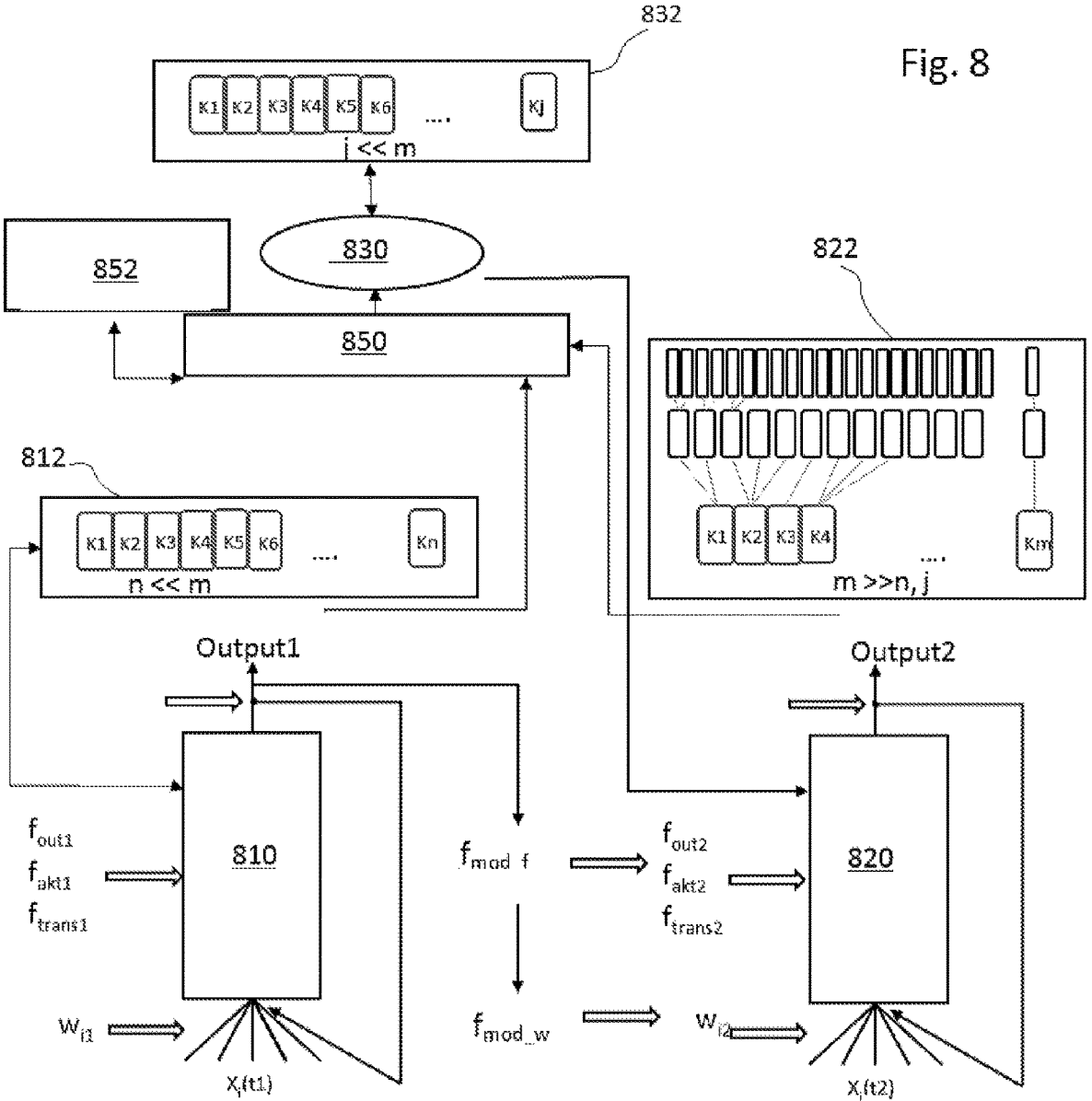

FIG. 5 schematically illustrates a system as in FIG. 1 with the associated classification memories;

FIG. 6 shows an alternative system with three coupled artificial intelligence units, FIG. 7 shows an exemplary extended system with a third artificial intelligence unit and a projection plane; and FIG. 8 shows the system of FIG. 7 with associated storage elements.

DETAILED DESCRIPTION OF EMBODIMENTS

FIG. 1 shows an exemplary embodiment with two linked artificial intelligence units 110, 120, which will be described in more detail below. In the following explanations, the artificial intelligence units are exemplarily designed as neural networks.

Thereby, a first artificial intelligence unit is provided, here in the form of a first neural network 110, which can essentially be used to categorize the input signals $x_i$ and to influence a second artificial intelligence unit 120, here a second neural network, with the result of this categorization. Preferably, the results of the first neural network are not used as input values for the second neural network, but are used to influence existing weights, step sizes and functions of the network. In particular, these parameters of the second neural network may be influenced such that they are not completely redefined, but rather the original parameters of the second network 120 are modulated or superimposed based on the output signals of the first neural network 110. This means that the two neural networks otherwise preferably operate independently, e.g. train their basic values themselves, but may be coupled by a superposition. In this regard, the two neural networks may be substantially similar in design to each other, but with, for example, significantly different levels of complexity, such as the number of layers and classifications present. Further, each of the neural networks has its own memory.

In one possible embodiment, the first neural network 110 may be used as a categorizing network which serves to categorize the input values coarsely and quickly, while then, on this basis of the categorization result, the second network is influenced accordingly by modulating parameters of the second network. For this purpose, the first neural network may be a network with comparatively few levels, having a memory with few classes K1, K2, . . . $K_n$, which are preferably highly abstracted in order to achieve a coarse categorization. For example, this first neural network could be limited to 10, 50, 100 or 500 classes, these numbers being of course only to be understood as rough examples. In this regard, the training of the first neural network may in particular be performed individually and independently of further coupled neural networks. Additionally or alternatively, however, a training phase in a coupled state with one or more coupled neural networks may also be used.

The first neural network is thus intended to provide a usable output within a short period of time, which can be used to meaningfully influence the second neural network. Weights and functions can be generated from the output values Output1 of the first neural network 110, which can be superimposed on the self-generated weights and functions of the second neural network 120. This means that the second neural network initially functions independently and does not fully adopt the output values of the first network or the parameters obtained therefrom. Also, the second neural network 120 may initially be trained independently in the usual manner and thereby have self-generated weights.

In this context, the second neural network may be designed to be significantly more complex than the first neural network and, in particular, may have more levels and/or memory classes. The degree by which the complexity of the second neural network is increased compared to the first network can be determined differently depending on the application. The input values or input data for the second neural network are thereby preferably the same input values as for the first neural network, so that a more complex analysis can now be carried out with the same data. Alternatively, however, output values of the first neural network can also be used, at least in part, as input values of the second network. In particular, in the case of a significantly different complexity of the second network, for example, a second network could be provided to which both the original input values which also served as input values for the first network are supplied as input values, and additionally the output values of the first network are used as input values of the second network.

Figure 2:
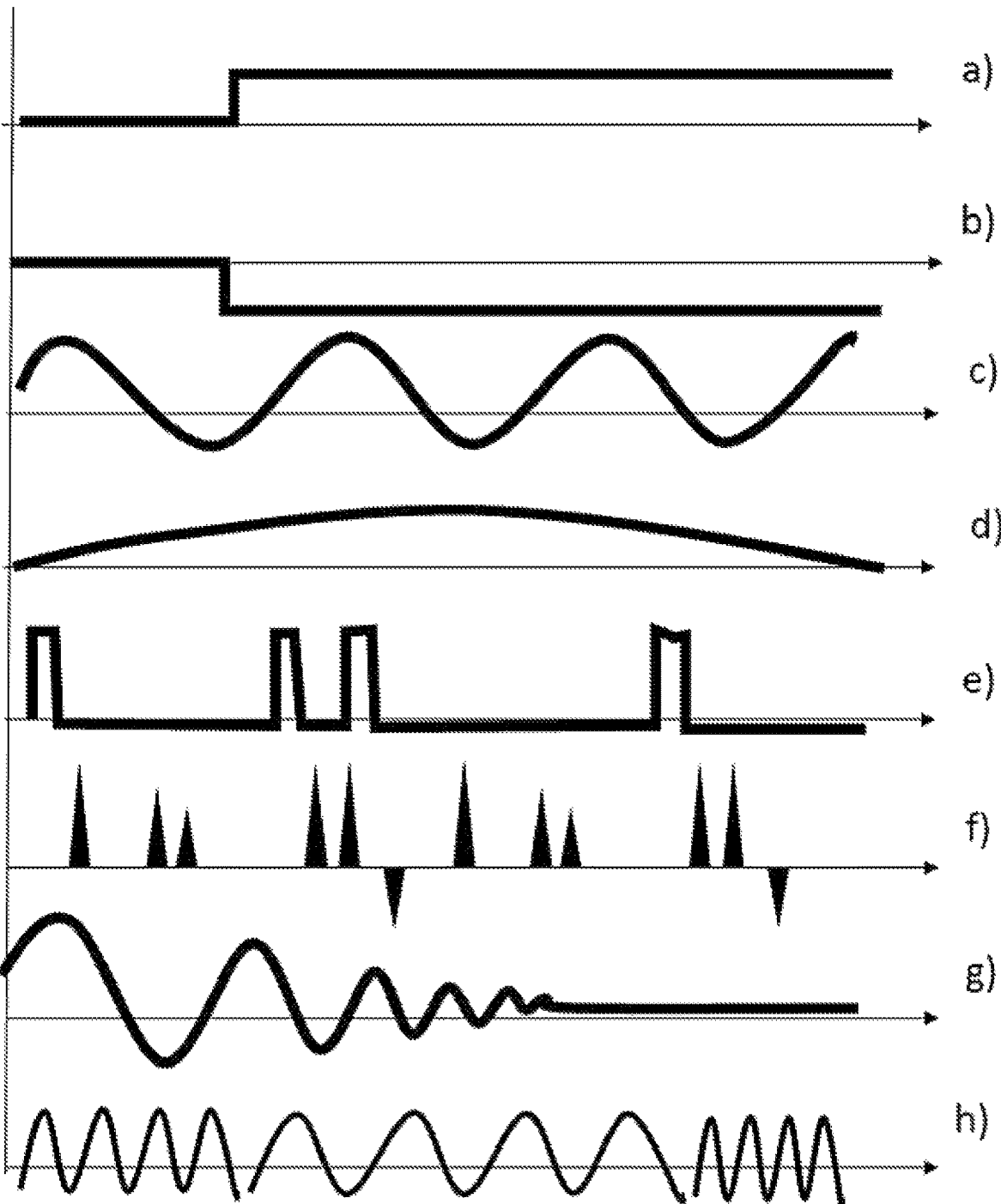

FIG. 2 shows exemplary different modulation functions $f_{mod}$, with which one or more parameters of the second neural network can be superimposed. In principle, the superposition or modulation can take place in any way. For example, when a modulation function $f_{mod\_w}$ is applied to the weights $w_{i2}$ of the nodes, it may be provided that the weighting matrix of the second network 120 is used as an argument of the modulation function, or one-dimensional (even different) functions may be provided for each one of the weights wiz. When a modulation function $f_{mod\_f\_}$ is applied to one of the descriptive functions of the second neural network, i.e., to a transfer function $f_{trans2}$, an activation function $f_{akt2}$, a propagation function, or an output function $f_{out2}$ of the network 120, this may be done by combining the two functions, and again a modulation function $f_{mod\_f}$ may be applied to either only a portion or all of the relevant descriptive functions (e.g., to all of the activation functions $f_{akt2}$ of the second neural network 120). Modulations may be applied equally to all nodes of a network, or alternatively may be applied to only a portion of nodes, or may be modulated differently for each node. Similarly, for example, modulations may be applied separately or otherwise staggered for each layer of a network.

In particular, the modulation functions fmod can also be time-dependent functions, so that the weights wiz or functions of the second neural network are changed in a time-dependent manner. However, static modulation functions for modulating the second neural network are also conceivable. In this case, the modulation is applied to the parameters of the second network 120 which are already originally defined for this second network (such as the propagation functions or the activation functions), or which were obtained independently during the training phase, such as the adapted self-generated weights.

Eight different time-dependent modulation functions are shown as examples in FIG. 2. Example a) shows a simple binary step function in which the value zero is specified up to a specified time and then a value greater than zero is specified. Here, the second value can in principle be 1, but could also have a different value, so that the original parameters are additionally subjected to a factor. In this way, for example, a weighting is switched on and off in a time-dependent manner or amplified in a time-dependent manner. Example b) shows a reverse situation, in which a step function with a second value less than zero is predetermined. Likewise, as an alternative to the variants of examples a) and b), step functions are conceivable which comprise two different values not equal to 0, so that the level is raised or lowered in a corresponding time-dependent manner.

Example c) shows a periodic modulation function which can also be applied to any parameter of the second network and in this way will periodically amplify or attenuate certain elements in a time-dependent manner. For example, different amplitudes and/or periods for such a function could also be chosen for different nodes and/or different layers, respectively. Any periodic function could be used at this point, such as a sinusoidal function or even non-continuous functions. Depending on the type of concatenation of the functions with the self-generated functions of the second network, only positive or also negative function values can be selected.

Example d) shows a slow continuous transient increase and decrease in level. Example e), on the other hand, describes brief, approximately rectangular high levels with an otherwise low function value, which can optionally be zero. Similarly, example f) shows irregularly distributed and very short peaks or spikes, which thus cause a level increase for a very short period of time. Here, the peaks have different amplitudes and can take on both positive and negative values (relative to the basic value). For the variants from examples e) and f), both regular, periodic and temporally completely irregular (e.g. stochastically determined) distributions of the peaks or amplifications can be present. In this context, short level increases can, for example, lie within the time of a decision cycle of the second neural network, while longer pronounced level changes can extend over several decision cycles.

Example g) in FIG. 2 further shows a damped oscillation, which could also be arbitrarily designed with different dampings and amplitudes. Finally, example h) shows a time sequence of different oscillations around the fundamental value, where in particular the period lengths of the oscillations differ, while the amplitude remains the same. This combination of different oscillations can also be designed as an additive superposition, i.e. beat.

In general, any modulation functions are conceivable and the functions shown in FIG. 2 are only to be understood as examples. In particular, any combination of the example functions shown is possible. It is also understood that the baseline shown in all examples can run at 0 or at another basic value, depending on the desired effect of the modulation function. For a pure concatenation of the modulation function with the respective modulated function, a base value of 0 and corresponding increases in the function value can be used to ensure that the respective node only contributes to the processing in a time-dependent manner and is switched off at other times. With a basic value of 1, on the other hand, it can be achieved that, for example, with the example in FIG. 2*a*), a modulation function which is applied to the weights first reproduces the self-generated weights of the modulated network as a basic value and then, from the stepped higher value, has correspondingly increased weights. Accordingly, such a function also acts on the modulation of functions such as the activation function.

As described above, a modulation function may be formed based on the output values of a first artificial intelligence unit, i.e., in the present example, based on the first neural network. The relationship between the output values and the modulation function formed therefrom may be arbitrary. For example, this correlation may be generated at least in part in a joint training phase of the coupled network. In other embodiments, it may be predetermined how the dependency between the modulation functions and the output values of the first network is designed. Optionally, it could also be decided that for certain output values no modulation of the second network takes place at first.

Figure 3:
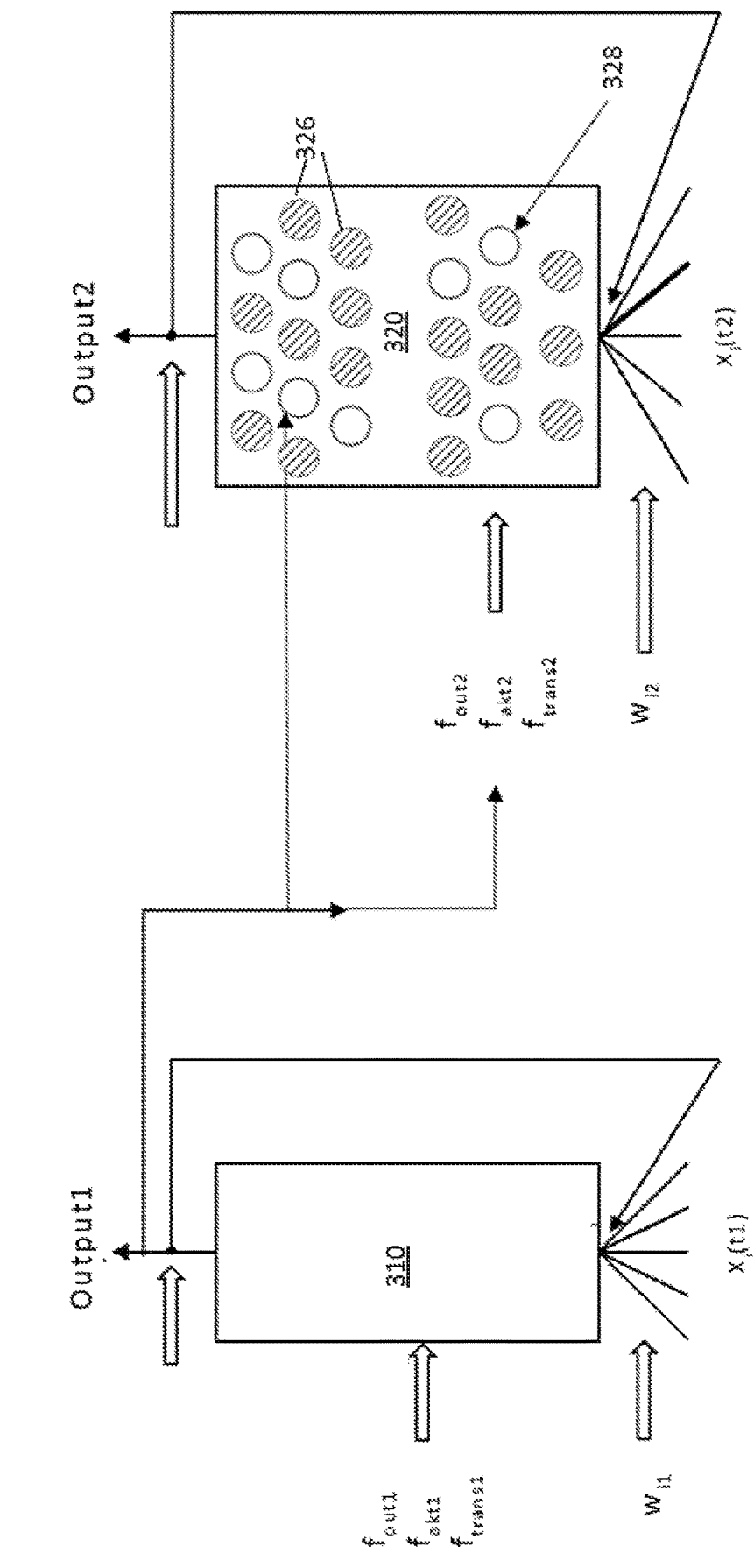
FIG. 3 illustrates the application of a dropout method in two coupled neural networks according to one embodiment.

Alternatively or in addition to applying modulation functions to the weights and functions of a second neural network, a coupled dropout method can be applied, which is illustrated in FIG. 3. This is conventionally a neural network training procedure in which only a portion of the neurons present in the hidden layers and the input layer are used in each training cycle and the remainder are not used ("drop out"). To this end, the prior art typically sets a dropout rate based on the feedback errors of the network, which determines how large a fraction of the total network is made up of neurons that are switched off. Similarly, instead of neurons, some of the edges or connections between neurons could be switched off.

Such partial disconnection of neurons and/or edges may now also be used in a second neural network in exemplary embodiments, wherein now the dropout parameters are not used based on the error feedback of the network itself, but as in time-dependent modulation, depending on the output values of a first neural network. In this regard, for example, a dropout rate for the second neural network may be determined based on the output values Output1 of the first neural network 310, which is then applied to the second network. The figure again shows two coupled networks 310, 320 as in FIG. 1, but now the neurons or nodes 326, 328 of the second network 320 are schematically indicated as circles. Here, the connecting edges are not shown, and the arrangement of the neurons shown is not intended to have any compelling relationship to their actual topology. Via the dropout rate, a portion of the available neurons are now deactivated and thus not used. The active neurons 326 of the second network are shown shaded in the figure, while the unfilled neurons are intended to represent the dropout neurons 328.

In a general manner, the coupled dropout described herein can also be understood as a modulation function $f_{mod}$ by using either 0 or 1 as the modulation function for the weight or, for example, the output function of each node. This may be based on the output values of the first network to determine which of the neurons 326, 328 are switched off, or only the rate may be specified and stochastic functions may be used to determine which neuron is switched off. In this regard, the dropout rate may also again be determined based on the output values Output1 of the first network 310. In this regard, a dropout modulation function may optionally also cause a time-dependent shutdown, which would correspond, for example, to a concatenation of a dropout function with a modulation function as shown in FIG. 2. Similarly, a sequence of pattern shutdowns that have been proven in prior training may also be employed, such that, for example, cyclic pattern variations are employed for shutdown in the second neural network 320.

In general, the dropout can ensure that the working speed of a neural network is increased. It also prevents neighboring neurons from becoming too close in behavior. The coupled dropout as described above can be used both in a joint training phase, in which the two networks are coupled, and in an already trained network.

To ensure that the coupled neural networks complement each other in a meaningful way, it can be determined which of the neural networks dominates the overall system at any given time. The network whose output values determine the output of the overall system can be designated as the dominating network or dominance. In the following, it is assumed that only exactly one network in a group of two or more coupled networks is dominant at any time, and thus the output of the dominating network is equal to the output of the overall system. However, other embodiments are also conceivable in principle, so that, for example, rules are specified which describe a processing of the output values of the dominating nets to a final overall output value in the case of more than one dominating net.

In exemplary embodiments, a timer or timing element can be implemented for this purpose, which defines a time specification for one or more of the coupled neural networks. In this context, this time specification is preferably to be understood as a maximum value or temporal upper limit after which an output value of the respective network must be present, so that an output can also be present earlier. At the latest after expiry of the time specified for a particular network, an output value of this network is then evaluated. The timer can thus control and/or change the dominance between the coupled nets on the basis of fixed time specifications.

Figure 4:
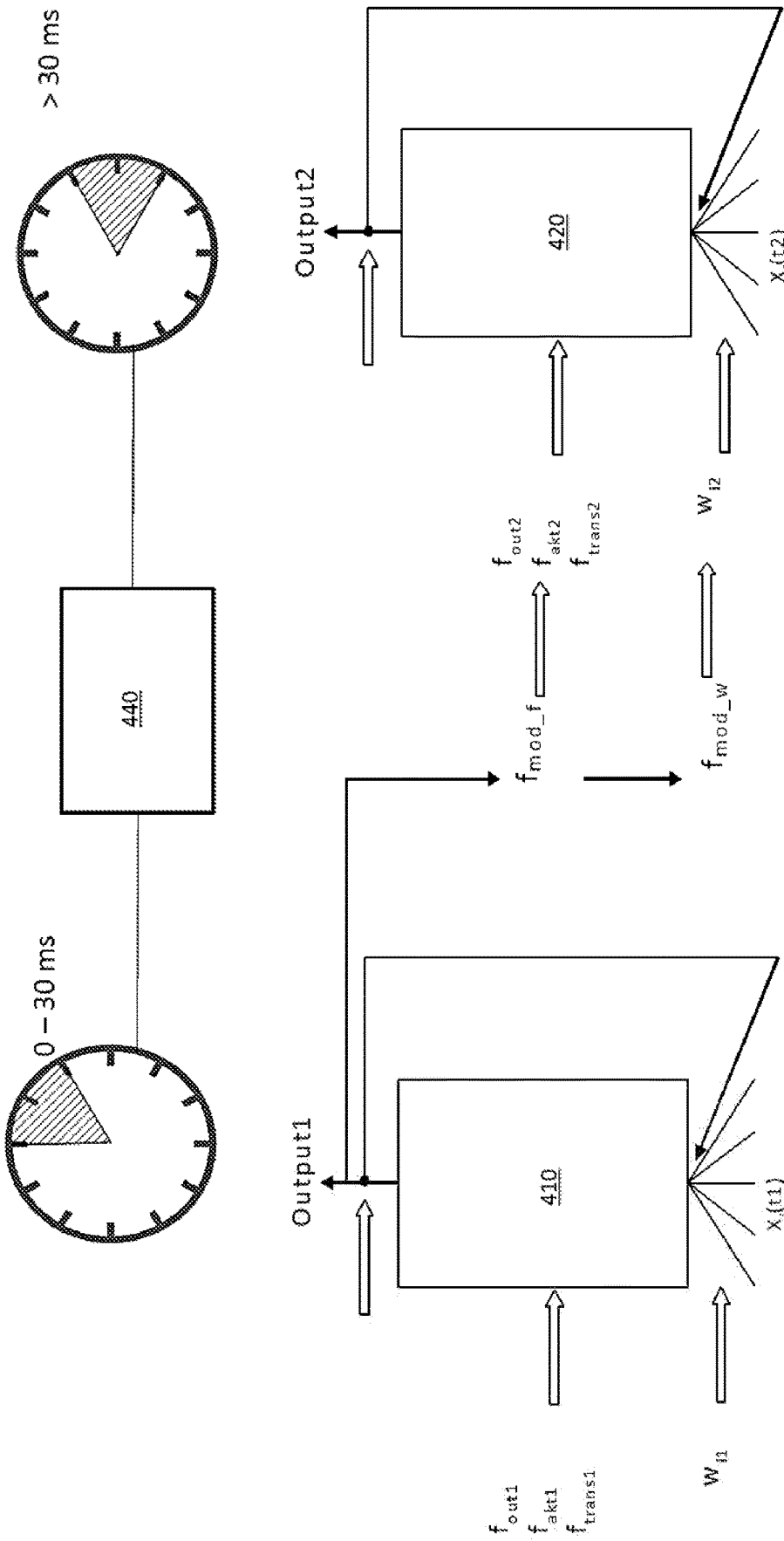
FIG. 4 shows a system as in FIG. 1 with an additional timer.

An exemplary embodiment of this type is shown in FIG. 4. Here, the formation and coupling of the two neural networks 410, 420 may correspond to the example already described in FIG. 1. The timer 440 now ensures that the output of the first neural network 410 is evaluated at the latest after a predetermined time, which is defined by a predetermined time parameter value. The required time may be measured, for example, from the time the input values $X_i$ are fed into the respective network. The choice of the predetermined time parameter for a network may thereby be carried out in particular depending on the complexity of a network, so that usable results can actually be expected in the predetermined time. In an example such as that previously described, in which the first neural network 410 is preferably formed by a network with a few hidden layers and a small number of classifications, a correspondingly short time can thus also be selected for this first network. Similarly, other considerations may be taken into account when choosing the time parameters for a network, such as the hardware available, which has a decisive influence on the computation time of the networks, and/or also the application area considered by the coupled networks. Further, the predetermined timing parameters may be variable and may, for example, be modified or redefined depending on results from at least one of the coupled neural networks. It is understood that such a time specification should comprise at least the time period required as a minimum time for traversing the respective network 410, 420 once. In FIG. 4, as an example, a time span of 30 ms is specified for the first network, so that during a process run, this network dominates in the time from 0 ms to 30 ms from the start of the process. However, a suitable other value for this time span can of course also be selected.

During the time period specified by the time parameter for the first network 410 (here 30 ms), the first neural network will process the input values $X_i$ in the usual manner. After the predetermined time has elapsed, the output Output1 of the first neural network 410 may be used to generate functions that are used to superimpose or modulate the second neural network's own weights and functions. Furthermore, the output values of the first neural network may also be processed independently as an alternative or in addition to being used to influence the second network 420 and used, for example, as a fast output of the overall system.

Once the modulation functions $f_{mod\_f}$, $f_{mod\_w}$ have been applied to the second neural network 420, the timer 440 may start a new timing measurement, now applying a second timing parameter predetermined for the second neural network 420.

In this regard, the second neural network 420 can optionally also independently utilize the input values $X_i$ even before the modulation by the obtained modulation functions $f_{mod\_f}$, $f_{mod\_w}$, so that, for example, the input values can also be given to the second neural network 420 even before the start of the second predetermined time period and can be processed there accordingly. After the first time period has elapsed, the parameter values and functions of the second neural network are then superimposed by applying the corresponding modulation functions $f_{mod\_f}$, $f_{mod\_w}$. In this regard, one or more modulation functions may be formed for different parts of the second neural network 420, for example for the weights, output functions, propagation functions and/or activation functions of the second neural network. In the case of a second neural network 420 that is formed to be significantly more complex than the first neural network 410, for example by having significantly more layers and nodes and/or by having a higher number of memory classes, the second neural network will require a comparatively higher computational effort and thus also more time, so that in this case the second time period may be selected to be correspondingly longer.

In this regard, optionally each of the networks 410, 420 may continue to continuously process and evaluate the input values even while another network is determined to be the dominant network in the overall system based on the current time spans. In particular, in the example shown of two coupled networks, the first network may continuously evaluate the input values even while dominance is with the second network and therefore the output values of the overall system may correspond to the output values of the second network after the second time period has elapsed and a solution has been found by the second network. In this way, a fast categorizing network such as the first network 410 described herein, which evaluates the available input values throughout, can also perform short-term interventions to the extent that the output values found find their way into the overall output. Such embodiments will be described in further detail below.

As a result of such a time control by predetermined time periods in a timer, the overall system can make decisions early and, for example, already be capable of acting without the final evaluation and detailed analysis by the second neural network already having to be completed. As an example, a situation in an autonomous driving system may be considered to be evaluated by such a system with at least two coupled networks. By means of the first unit or the first neural network, an early categorization "danger" can be achieved, which does not yet involve any further assessment of the nature of the danger, but can already lead to an immediate reaction such as a slowing down of the speed of the vehicle and the activation of the braking and sensor systems. At the same time, based on the categorization, namely under the influence of the modulation by the output values of the first network, the second neural network performs a more in-depth analysis of the situation, which can then lead to further reactions or changes of the overall system based on the output values of the second network.

It is also conceivable not to specify a time limit for each of the coupled networks, but only for one of the networks (or, if more than two networks are coupled, also for only a subset of the coupled networks). For example, in the above example, a timer could be applied to the first fast categorizing neural network, while the second network is not given a fixed time constraint, or vice versa. Such an embodiment may also be combined with further methods for determining the currently dominant network, which are described in further detail below.

In all embodiments with an inserted timer, it can be provided that the output values of the neural network which currently has an active timer are used as the output of the overall system. Due to the time required by a network to reach a first solution for given input values, there is a certain latency time within which the previous output values (of the first or second network) are still available as total output values.

If timers are only defined for some of the coupled nets, e.g. a timer is only active for a first net, it can be defined, for example, that the output of the overall system generally always corresponds to the output of the second net and is only replaced by the output of the first net if a timer is active for the first net, i.e. a predefined period of time is actively running and has not yet expired.

In a system with more than two nets, a reasonable synchronization of the nets among each other can also be made possible by aligning the predetermined time spans and changing the timer, especially if several nets with different tasks are to arrive at a result simultaneously, which in turn is to have an influence on one or more other nets. Similarly, by adjusting the predetermined time periods and sequences, synchronization can also be achieved among several separate overall systems, each comprising several coupled networks. In this context, the systems can be synchronized, for example, by a time alignment and then run independently but synchronously according to the respective timer specifications.

In addition or alternatively to changing the respective dominating neural network in the overall system based on a timer, each of the neural networks itself may also make decisions to hand over dominance in a cooperative manner. This may mean, for example, that a first neural network of an overall system processes the input values and arrives at a certain first solution or certain output values.

As with the change of the center of gravity with the help of the timer, it can be specified here that the output values of the total net correspond in each case to the output values of the currently dominating net.

For this purpose, for example, changes in the input values may be evaluated. As long as the input values remain substantially unchanged, the dominance distribution among the coupled networks may also remain substantially unchanged, and/or may be determined based solely on a timer. However, if the input values suddenly change, a predetermined dominance may be established that overrides the other dominance behavior of the coupled networks. For example, for suddenly changing input values, it may be determined that dominance will initially revert to the first neural network in any case. This also restarts an optionally present timer for this first neural network and performs the sequence as previously described earlier. A significant change in the input values could occur, for example, if sensor values detect a new environment or if a previously evaluated process has been completed and a new process is now to be triggered.

Threshold values can be specified in the form of a significance threshold, which can be used to determine whether a change in the input values should be considered significant and lead to a change in dominance. Individual significance thresholds may also be predetermined for different input values or for each input value, or a general value, for example in the form of a percentage deviation, may be provided as a basis for evaluating a change in the input values. Likewise, instead of fixed significance thresholds, there could be thresholds that can be changed in time or adaptively and depending on the situation, or they could be functions, matrices or patterns, on the basis of which the significance of the change can be evaluated.

Alternatively or additionally, the change in dominance among the coupled networks may be made dependent on the output values found for each network. For example, depending on the embodiment, the first neural network may evaluate the input values and/or their change. In this context, significance thresholds may be predetermined in each case for the classes which are available for the first neural network for classification, so that if the first neural network finds a significant change in the class found for the input data, a transfer of dominance to the first neural network takes place immediately, so that a rapid re-evaluation of the situation and, if necessary, a reaction can take place. In this way, it can also be prevented that despite a significantly changed input situation, which was detected by the first, fast categorizing network, the analysis is continued for an unnecessarily long time without taking the change into account by the second neural network in depth.

In all of the above examples, the output values of the overall system can be further used in any way, for example as direct or indirect control signals for actuators, as data that is stored for future use, or as a signal that is passed on to output units. In all cases, the output values can also initially be further processed by additional functions and evaluations and/or combined with further data and values.

FIG. 5 again shows the simple embodiment example as in FIG. 1 with two unidirectionally coupled networks 510, 520, whereby a classification memory 512, 522 is now schematically shown for each of the networks. The type of classifications $K_i$ used is initially of secondary importance here and will be described in more detail below. In particular, the dimension and structure of the two classification memories of the first 512 and second network 522 may differ significantly, so that two neural networks with different speeds and foci or centers of gravity are formed. Thus, for example, as already briefly described, an interaction of a fast, coarsely categorizing network and a slower, but more detailed analyzing network can be achieved to form a coupled overall system.

In the present example, a first neural network 510 is formed with relatively few classifications K1, K2, ..., $K_n$, which may also follow, for example, only a flat hierarchy, such that categorization is performed in only one dimension. Preferably, such a first network 510 may also be formed with a comparatively simple topology, i.e. with a not too large number n of neurons and hidden layers. In principle, however, the network topology may be substantially independent of the classifications.

The second neural network 520 may then have a significantly larger and/or more complex classification system. For example, this memory 522 or the underlying classification may also be hierarchically structured in multiple levels 524, as shown in FIG. 5. The total number m of classes K1, K2, ..., Km of the second network 520 may be very large, in particular significantly larger than the number n of classes used by the first neural network 510. For example, the number m, n of classes could differ by one or more orders of magnitude. Thus, an asymmetric distribution of the individual networks in the overall system is achieved.

Rapid classification by the first neural network 510 may then be used to quickly classify the input values. Abstract summary classes may preferably be used for this purpose. In one example, the classification of a sensed situation (e.g., based on sensor data such as image and audio data) may then be initially performed by the first neural network 510 as a "large, possibly dangerous animal" without performing any further analysis for this purpose. This means that, for example, no further classification by animal species (wolf, dog) or as a dangerous predator is made in the first network, but instead classification is made only according to the broadest possible general characteristics, such as size, detection of teeth, attack postures, and other characteristics. This data, which essentially corresponds to the output "danger", can then optionally already be passed on to appropriate external systems for preliminary and rapid response, such as a warning system for a user or to specific actuators of an automated system. Furthermore, the output Output 1 of the first neural network 510 is used to generate the described modulation functions for the second neural network 520.

The same input values $X_i$, e.g. said sensor values, are also given to the second neural network 520. In this case, the input values can be input immediately, i.e. substantially simultaneously as to the first network, or with a delay, in which case they are input before or only when the modulation functions are applied, i.e. when the result of the first network is available, depending on the embodiment. Preferably, they should not be given to the second neural network later, in particular in the case of time-critical processes, in order to avoid delays. The second neural network then also computes a solution, and the self-generated weights original to this second network and its basis functions (such as the specified activation functions and output functions) can each be superimposed based on the modulation functions formed from the output values of the first network. This allows the iterative work of the second network to omit a large number of possible variants for which there would be no time in the case of a critical situation (e.g., a hazardous situation) rapidly detected by the first network. While the slower analysis of the second neural network takes place, possible reactions can already be executed on the basis of the first neural network, as described. This corresponds to a first instinctive reaction in biological systems. The hierarchical and, compared to the first network, significantly larger memory of the second network then allows a precise analysis of the input values, in the example mentioned a detailed classification into the class "dog", the respective breed, behavioral characteristics that indicate danger or a harmless situation, and others. If necessary, after the second neural network has reached a result, the previous reaction of the overall system can then be overwritten, e.g. by downgrading the first classification "danger" again.

Overall, for such a coupled overall system with asymmetric classification, it may be envisaged, for example, that the classes $K_n$ of the fast-classifying first network 510 mainly perform abstract classifications such as new/known situation, dangerous/undangerous event, interesting/uninteresting feature, decision required/not required and the like, without going into depth. In this regard, this first classification need not necessarily correspond to the final result ultimately found by the second unit 520. However, the two-stage classification by at least one fast and one deep analyzing unit thus allows for sentiment-like or instinctive reactions of an artificial intelligence overall system. For example, if an object is identified by image recognition that could possibly be a snake, the "worst case" may preferably be the result of the first classification, regardless of whether this classification is likely to be correct or not. What is present in the case of human intelligence as evolutionary knowledge and instinctive reaction can be replaced by a fast first classification with pre-programmed knowledge, so that appropriate default reactions (keep distance, initiate movement, activate increased attention) can also be performed by the overall system and its actuators. The additional modulation of the second learning unit on the basis of this first classification can then be understood similarly to an emotion-related superposition, i.e., for example, corresponding to a fear reaction that automatically initiates a different conscious situation analysis than a situation understood as harmless. The superimposition of the parameters of the second neural network, which is performed by the modulation functions, can thereby cause the necessary shift into other classification spaces that are otherwise not reached by default or not reached immediately.

Accordingly, such systems can be used for a variety of application areas, for example in all applications in which critical decision-making situations occur. Examples are driving systems, rescue or warning systems for different types of hazards, surgical systems, and generally complex and non-linear tasks.

In the embodiments described so far, only two artificial intelligence units have been coupled together. However, this idea is in principle also applicable to more than two units, so that, for example, three or more artificial intelligence units may be coupled in an appropriate manner, whereby it may be determined which of the units may modulate the parameters of a particular other unit or units. FIG. 6 shows an example in which three neural networks 610, 620, 630 (and/or other artificial intelligence units) may be provided, wherein the output values of the first network 610 yield modulation functions for the weights and/or functions of the second network 620, and wherein in turn output values of the second network yield modulation functions for the weights and/or functions of the third network 630. In this way, arbitrarily long chains of artificial intelligence units could be formed, which influence each other in a coupled manner by superposition.

Similar to the earlier example with two neural networks, in one embodiment all coupled networks can receive the same input values and the processing can only be coupled by the modulation of the respective networks. Equally, however, embodiments are conceivable in which, for example, a third neural network is provided subsequent to two neural networks as in FIG. 1, which receives the output values of the first and/or second network as input values. Optionally, the functions and/or weights of this third neural network could also be modulated by modulation functions which are formed, for example, from the output values of the first network. These could be the same or different modulation functions than the modulation functions formed for the second network. Alternatively, for example, the output values of the third network could be used to form additional modulation functions which are then recursively applied to the first and/or second network.

It is understood that various further combinations of correspondingly coupled learning units are possible, in which at least two of the connected units have a coupling by forming modulation functions for the descriptive parameters of the units, in particular for the case of neural networks for the weights and/or functions of a network. As the number of coupled units increases, more complex variations of the modulations and couplings are conceivable.

As already noted at the beginning, the embodiments described here were described as examples with respect to neural networks, but can in principle also be transferred to other forms of machine learning. In this context, all variants are considered in which it is possible to influence at least a second artificial intelligence unit by a first artificial intelligence unit by superposition or modulation on the basis of output values. Modification of the weights and functions of a neural network by superposition using modulation functions from the preceding examples may be replaced by corresponding modulation of any suitable parameter controlling or describing the operation of such a learning unit. In each of the examples, the term "learning unit" or may be replaced by the special case of a neural network, and conversely, the described neural networks of the exemplary embodiments may also each be implemented in a generalized manner in the form of an artificial intelligence unit, even if it is not explicitly stated in the respective example.

In addition to neural networks, examples include evolutionary algorithms, support vector machines (SVM), decision trees, and special forms such as random forests or genetic algorithms.

Similarly, neural networks and other artificial intelligence units may be combined. In particular, it is possible to replace, for example, the first neural network from the preceding examples, which was illustrated as a fast categorizing unit, with any other artificial intelligence unit. In this context, it is also possible to selectively choose a method that is particularly suitable for a fast, coarse classification of features. However, the output values of such a first learning unit can then be applied in the same way as described for two neural networks to form modulation functions for a second artificial intelligence unit, which in particular can again be a neural network.

In addition or alternatively to the described variants, a system comprising two or more artificial intelligence units may be further improved by using at least one artificial intelligence unit, for example, to evaluate or validate results of another artificial intelligence unit, or to perform further tasks as illustrated below. This can, for example, be formed in principle by a system with two artificial intelligence units, one of which subsequently evaluates and optionally influences the results of the other, for example by determining the overall output of the system. However, more complex variants are equally possible, for example a system comprising three artificial intelligence units, two of which are modulatively coupled to each other as previously described, and a third unit is now added as a validating unit.

In this regard, again as an exemplary embodiment, a system comprising a first neural network 710 and a second neural network 720 may be considered as described in connection with FIG. 1 or 5, to which a third neural network 730 is added. This third network 730, or more generally the third artificial intelligence unit, may also have its own classification memory. Such an extended system is shown in FIG. 7. In addition, a projection plane 750 may now be provided. The projection plane 750 may be a software and/or hardware unit or a combination of several such units. In particular, the projection plane may form a composite of several units, which may also include the artificial intelligence units and their memory elements. The projection plane 750 may thereby form a central unit in which the outputs of at least the second unit (and optionally further units) are processed and linked, for example a multiplexer unit, a unit which generates sequences from data, a unit which, after a positive or negative evaluation, imprints an identifier or label on the stored data or sequences, which can, for example, abbreviate decisions when comparing new data with stored data. These functions may also be performed in whole or in part by program modules. The projection layer may further comprise input and/or output units, such as a screen or an acoustic unit, thereby enabling to communicate with a user or a user supporting, for example, a training phase of the system, and to assess, for example, the current processing status.

A storage element may be associated with the projection plane 750 as a projection memory in which data from the projection plane may be stored, at least temporarily. The storage period for this data may be generally defined, for example, but may also be defined by one of the units, such as the third, validating unit. Depending on the embodiment, the projection layer memory may essentially serve as a short-term memory, the contents of which may be reviewed, erased, overwritten and/or transferred to other memories, such as the memory elements of the respective neural networks or units, as required. Thus, the projection memory can be implemented, for example, as a ring memory in which, in each case, after a certain number of entries or a certain amount of data, the memory is "full" and therefore the previous data is overwritten from the beginning, which corresponds to a ring structure.

The third neural network (agent) 730, which is executed here as a validating unit, now evaluates data that is present in the projection plane 750. This could be, for example, input data, output data from one of the other two networks 710, 720, and/or further data. For example, only output data, optionally with additional information, could also be processed in the projection plane 750. Further, it is possible that the data is processed or, for example, simplified in some manner prior to the projection plane. In response to the processing of the data by the third unit 730, which may correspond to a classification or evaluation, various actions may be performed that have an influence on the final output values of the overall system and the associated signals to actuators, output interfaces and others, and/or actions that influence the further behavior of the overall system and in particular the other units included in the system. These actions are described in more detail below.

In this regard, the data in the projection plane 750 may also be associated with each other, resulting in at least one further piece of information. For example, it may be indicated via a corresponding assignment or sub-parameter that a particular output value of the second network 720 arose from a particular input value also present in the projection plane 750 and that these two values are therefore linked. Further, temporal parameters may be present indicating, for example, at what time a particular output value was output. Thereby, such temporal parameters could comprise an absolute time indication, but also a relative time indication depending on the current evaluation time or another reference time. Similarly, rather than a fixed point in time, a temporal segment could be specified to which one or more input and/or output values of the networks are assigned. In addition or alternatively to an actual temporal parameter, a sequence may be associated with at least a portion of the data, so that even without an explicit time specification in the projection plane it is recognizable in which sequence a plurality of present data values were generated or processed, e.g. in the form of an assigned numbering for the output values in the projection plane.

In this way, the data present in the projection plane 750, for example input and output values, may form temporal sequences. Optionally, such sequences may also be marked so that, for example, it is determined that a certain time period or determined output values belong to a defined sequence. For further processing, storage or evaluation, sequences formed in this way may then be treated as a whole. Alternatively, different input and output values belonging to the same time period or sequence can then be processed together, for example compared with each other. By placing the data in the projection plane over time, and grouping them into specific processes and sequences that can be accessed again, a memory-like construct can be made possible. FIG. 7 also again shows a timer 740 which, in accordance with the idea described in connection with FIG. 4, can also be used in this system to control dominance between units 710, 720.

FIG. 8 again shows the system from FIG. 7, in which the memory elements of all system elements are now also shown. The third neural network 830 can also be assigned a classification memory 832, which can be designed with comparatively few levels and classes Kj as shown here. In principle, however, a more complex design is also possible. In the present example, it is assumed that the number Kj of levels and/or classes for the third neural network 830 is significantly smaller than for the second neural network 820, which is provided as an analyzing unit, that is, for example, smaller by one or more orders of magnitude. In the schematic drawing, the memory 812 of the first, categorizing network 810 is similarly complex in design to the memory 832 of the third, validating network 830; however, this is not necessarily predetermined. The memories may also differ further. However, in a variant in which the three networks 810, 820, 830 are assigned the tasks as previously described, a clear asymmetry between the memory sizes and complexities will typically prevail, with the second network 820, which is designed as an analyzing network, having a much larger and more complex classification memory 822.

A memory 852 is also provided for the projection plane 850, which can be designed, for example, as a volatile memory element or as a non-volatile memory element in the form of a ring memory or another short-term memory, as already mentioned in connection with FIG. 7. The data to be processed in the projection plane 850 is stored in this projection memory 852. The storage duration of the data and the choice of the data to be stored may be designed in very different ways. For example, a fixed storage period may initially be specified. After this time has elapsed, the data in the projection memory 852 may be discarded and/or overwritten. Additionally or alternatively, a part of the system, for example the third neural network 830, may make decisions about whether to pass the data in the projection memory 852, at least in part, to another element of the system. To prevent loss of data, this decision may be made before the predetermined storage period has expired. For example, the third neural network 830 may decide that some or all of the data stored in the projection memory 850 or 852 should be passed to another memory element for long-term storage. This may, for example, also be one of the memory elements 812, 822 of the neural networks, in particular the memory 822 of the second neural network 820 which, as the analyzing unit, may perform the essential part of the result determination. By storing in a memory of the other units in the system that later evaluate new situations, this may allow already evaluated situations to be incorporated in a manner similar to experiences made. In principle, however, a separate memory module (not shown) could also be provided as a long-term memory, in which it can be fixedly predetermined or definable by one of the units which unit can access the data stored there and to what extent. For example, it could be determined that only the second unit 820 (and, in the case of larger systems, e.g. further detailed analyzing units) access the long-term memory, and/or that the evaluating third unit 830 regulates the accesses.

The data present in the projection plane 850 may correspond to an image of a present situation, for example by combining input values such as acoustic data, image data, sensor data and texts, which then become an interpreted image of the situation by combining them with the output values of the various units.

The output values from at least one of the other networks 810, 820 may now be supplied to the projection plane 850, as shown by the arrows in the drawing. The optional inclusion of the input values is not shown here. The third neural network 830 receives the data from the projection plane 850 as input values and forms third output values therefrom. In this regard, all or only a defined portion of the data present in the projection plane 850 or in the projection memory 852 may be used as input values for the third network 830. Based on the obtained solutions or output values, the third network 830 may then trigger various further actions. For example, based on the third output values, a decision may be made as to whether the output values of the first 810 and/or second network 820 are within valid ranges or parameters, i.e., whether they are acceptable as valid solutions. If it is determined here that, for example, the current output values of the first and/or second network, which were determined as the overall output value of the system in the previous examples, are outside of permissible ranges, a reaction of the overall system can be prevented or stopped based on this evaluation, so that the previously obtained first/second output values of the first/second network are not passed on to actuators or interfaces, for example. The output values evaluated as inadmissible or invalid can then be discarded, but can alternatively also be stored together with this evaluation in order to be able to refer back to them in later situations, for example by comparison. In this way, evaluations of later situations can be simplified or accelerated by not pursuing solutions that have already been identified as invalid.

Conversely, output values and solutions can be checked not only for permissibility, but also whether they correspond particularly well to certain conditions or specifications, i.e. represent the most ideal solution possible. The output values found in this way can then preferably be used as the output of the overall system, or can be stored in a long-term memory, for example, so that they can be retrieved quickly in the future as the best solution found. Likewise, output values that have been evaluated as particularly disadvantageous or advantageous could be provided with a corresponding evaluation parameter, which can also be stored and/or further transmitted linked to these values. These evaluation options can be implemented individually or in combination with each other.

For example, the decision to transfer and store data from the projection plane 850, described previously, may be made based on such assessments by the third unit 830.

In a further embodiment, it is also possible that initially only the input values of the system used as input values of the first and second units are stored in the projection plane or its associated memory 852. This can be considered as an unprocessed image of a current situation. At the same time, the first and second units begin processing these input values as previously described, that is, using various means such as alternating dominance between the units and modulating the determining parameters and functions of the second unit.

The solutions found, i.e. the output values of the first and/or the second mesh, can then be transferred to the projection plane, where they can either overwrite the respective associated input values or can also be stored and linked together with them. For example, depending on the variation, any newer result obtained from the same input values may overwrite an older result. In other cases, the results may be transferred to the projection plane while retaining older solutions, so that, for example, a comparison of current and previous solutions can also be used to evaluate whether a later or earlier result better meets the specifications and boundary conditions of the third unit. As an example for a linkage in particular simultaneously superimposed elements or also superimposed elements are possible, as far as it concerns e.g. pictures.

Optionally, the previously described dominance between the coupled units can also be taken into account, so that, for example, only the output values of the currently dominant network are stored in the projection plane or its memory. Again, temporal parameters may be associated with the values. For example, time segments of equal or different lengths can be defined, to which the respective input values and output values are then appropriately assigned to reflect a temporal progression of a situation. For example, in a first time period the input values could be stored, while in a next time period output values of the first categorizing unit are stored, and subsequently output values of the second unit. Further, improved or at least modified output values may then be stored in further sections. For each block of output values, a time period may be predetermined, which may optionally, however, be marked as belonging together in order to clarify the sequence of a recognized situation.

In exemplary embodiments, control over the storage of data to or from the projection memory may also be assumed at least in part by multiple units of the system. For example, a situation has already been described in which, in a system with defined dominance of units, a check is made to see if the input values change beyond a predetermined level so that a new situation is assumed. In this case, the dominance may pass to the first categorizing unit to create a new rough classification of the input values. At the same time, the first unit may then provide a signal to the projection memory indicating whether the data stored there (corresponding to a previous situation) should be transferred to another memory element, such as the long-term memory, or whether it may be overwritten later. Similarly, depending on a current processing operation, the first and/or the second unit could adjust the storage duration in the projection memory to respond to different situations or targets. For example, a longer storage duration may be set in the projection memory when a long, in-depth solution search is required, while quick decisions may lead to quick changes in the stored data.

Optionally, it is also possible that one of the units can decide with priority on, for example, the storage duration, so that, for example, a decision by the first unit to discard previous data in the projection memory can be checked or blocked by the second unit, so that the respective data is nevertheless stored, for example in the case of recurring input values. Furthermore, it is also conceivable that, at least to a limited extent, one of the units can make changes to the classification memory of another unit and, for example, create new categories. However, protected areas can also be defined, in which all defaults are stored, which may not be changed or deleted by any unit.

If, as in the system of FIG. 4 or FIG. 7, a timer is provided which is able to measure time intervals and pass this information on to units, this timer can, for example, also monitor the specified storage duration. In this way, the storage times can also be coordinated or synchronized with the dominance distributions between the different units of a system. Alternatively, however, another part of the system may be provided for this purpose. In principle, the third network or the third learning unit can also change and redefine the predetermined storage duration. In this context, different specifications for the storage duration may also be defined for different values. For example, it may be determined that the output values of the first fast categorizing unit are stored in the projection plane only for a short time, so that a first storage duration time specification is defined for them, while the output values of the second unit are provided with a longer storage duration time specification. It is also possible that the output values of the first unit are stored only until output values of the second unit are available. Optionally, a check of the output values by the third unit could be waited for first. If it is determined that the output values of the second unit are not valid because they do not correspond to the specified boundary conditions, the storage of these values can be cancelled, while the rough output values of the first unit continue to be retained.

Additionally or alternatively, the third artificial intelligence unit may also further modify the modulation detailed between the first and second units based on its assessment made, or form its own modulation functions that may be applied to the parameters and functions of the second network. Thus, modulation functions can be applied to the second unit, i.e. the second network in the embodiment, by both the first and the third artificial intelligence units, thereby again influencing their output values. Similarly, based on the evaluation of the output values that has taken place, a third unit may also, for example, redefine or modify a dropout rate as already described for the nodes of a second neural network in order to influence the processing. This can also be used, for example, to increase the processing speed if finding a solution without a dropout would take too long. All these possibilities can take place in parallel and complementary to the coupling and modulation between the first two units.

The system can be designed in such a way that the third unit does not decide alone on the validity or invalidity of results and output values, but in combination with the other units of the system, for example by influencing the processing parameters, storage times and other elements.

Insofar as the third neural network is designed as an evaluating or validating unit, this can, for example, comprise classifications which essentially include features such as prohibitions, priorities and value-like specifications. By having such a third unit evaluate the output values of the other units, it can be ensured that only those solutions are allowed for the overall system that meet these specifications. These could be simple fixed boundary conditions of a system; but they could also be further developed into an ethics-like module that keeps the development and decisions of the overall system in a direction given by values and rules. These boundary conditions, which are given by, among other things, the classifications in the third network, can therefore preferably be fixed and stored without being changeable by the system. In other embodiments, however, it is also conceivable that a system learns these classifications at least in part itself, i.e. in accordance with a non-supervised learning, so that at least in part its own value system or learned set of boundary conditions is formed. It is also possible to use embodiments in which a basic system of non-changeable boundary conditions is predefined, which can then be supplemented in the course of a training phase or during operation and/or by external data input.

The constraints provided by the third unit can be applied both in a joint training phase of the coupled networks and in the later evaluation phase of an already trained system. Optionally, several separate presets corresponding to several completed groups of classifications could be provided in the classification memory of the third unit. One of these groups can then be selected as required, for example depending on the situation at hand. The recognition of the particular situation at hand and the assignment of the classification groups to be applied may again be based on the results of the first and/or second unit. In this way, for example, different risk appetites or "basic moods" of a system could be implemented. In this context, a basic setting may also be predefined, which is only changed in certain cases. It is also conceivable that new classification groups with additional or flexible boundary conditions for the third unit are actively formed from the unchangeable basic setting of the third unit in training and operating phases of the coupled system.

As an example, in the case of an autonomous vehicle or aircraft used to rescue people (e.g. an aerial drone), a riskier driving style may be allowed as long as no passengers are carried, especially if the vehicle is to arrive quickly at a predetermined location. Thus, after a rough recognition of the situation, e.g. "alarm situation", which can be done for example by the first unit, a corresponding classification group can be selected for the third unit, based on which the solutions or output values of all units are then evaluated. Thus, basic constraints can be further respected, e.g. avoiding accidents, but at the same time other constraints can be relaxed (such as fast cornering, accepting damage, or others). Once the system detects a new situation, such as the presence of passengers in the vehicle, a different classification group may be applied to the third unit, which may now be more focused on the well-being of the passengers or even rescued casualties. In an extended embodiment, further catalogues of criteria could then also be created, which can be used for classification in specific situations, for example for load transport, during fire fighting, during a reconnaissance flight or a reconnaissance trip, and others. If situations can be classified as such known situations, the third entity can then be limited to maintaining the validity of the boundary conditions and, as long as no contradictions occur, remain passive. However, if more complicated or unknown situations occur, which may result in damage or other undesirable consequences, the third unit may also intervene more actively in the solution finding of the second unit and, for example, specify new search spaces, change or modulate parameters of the second unit, or otherwise support the finding of a suitable solution.

In this way, therefore, the framework conditions of the overall system, such as prohibitions, priorities and a value system, are located in the memory of the third unit, preferably hard-coded. Processing acceleration can also be achieved by excluding certain solutions. The third unit can actively intervene in the solution finding of the second unit by actions such as reward and punishment or by inducing new step sizes. Thus, the output values of the second unit are also influenced by the third unit through a special type of feedback.

As a further option, the third learning unit can influence a timer and the associated determination of the dominance of individual units in the system, which is implemented in a system of several (e.g. here three) coupled units as already described in connection with FIG. 4 or 7. For example, the third unit can check whether the specified time parameters for the transfer of dominance lead to meaningful results or whether a different distribution or specification of the time periods should be specified. This can be used, for example, to react flexibly to situations that require more coarse categorizations than usual and, for example, need to be decided in a shorter time. Accordingly, a signal from the third unit to the timer module may be used to set one or more new timing parameters for each of the coupled networks as required, based on which further determination of dominance is then made as described earlier. Similarly, after evaluating the input values over time, the third unit could determine that the input values and thus the situations to be evaluated change massively very quickly, or that the situation remains unchanged quasi-statistically over a long period of time, and on this basis prescribe different time parameters for processing.

The described elements and process steps of FIGS. 7 and 8 are of course not intended to be limited to the illustrated embodiment with three neural networks. In particular, the basic idea of an evaluating unit can in principle be applied to any system of at least two artificial intelligence units.

A further element of an intelligent system comprising a plurality of coupled artificial intelligence units may be a language unit. In this context, a language is preferably understood here as a system-internal communication, which can optionally also be applied for communication with other, identical or similar systems. In particular, a language unit may be used to reflect and process the situations represented by the input and output values of the system in an abstracted form. For example, in the case of a unit that learns in a non-supervised manner, classifications can and should be formed independently without prior specification; such a system's own classification (recognition of situations, objects and conditions) can be understood as a language. In this context, a language unit may also be provided with its own associated memory and may optionally also be formed as a neural network. Depending on the embodiment, it may be convenient that a speech memory is, for example, closely associated with the second, analyzing unit of the system (according to the previous example embodiments) or is formed as part of this unit. If the speech unit has its own memory associated with it, this memory may be similar in structure and content to the memory of the second unit and may optionally be in communication with it, for example in order to exchange newly acquired classifications. A connection to the outside may also be provided for inputting and outputting data from the speech memory.

Preferably, such a unit can convert the memory categories and contents stored, for example, from the projection plane for long-term storage into abstract terms, while also forming a syntax and semantics that then allows logical application and processing of the contents. Such a language could be applied to communication between the individual learning units of the system, allowing abstract treatment of problems without direct involvement of the physical input values.

In all embodiments, it will be understood that the individual elements, e.g., memory elements, neural networks, interconnections between units, and further, may also be implemented differently than shown herein. For example, there may of course be further memory elements not shown in these schematic figures, or some or all of these memories may be in the form of a single physical memory element, e.g. suitably subdivided by addressing.

The various sub-approaches described above can, especially in combination with each other, lead to an associative and autonomously acting system. Such systems can cover a much broader range of applications than intelligent systems trained in only one specialized area. In conventional systems, data processing corresponds to finding error minima or success maxima in a multidimensional space. The more dimensions (through classifications, options, hierarchy levels) this space has, the more likely the system is to get stuck in local minima or maxima. The previously described coupling and influencing of a second unit by a first unit in the form of modulation functions applied to weights, step sizes, functions and more, on the other hand, allows jumps in the search space into initially unchecked and mostly irrelevant areas, which are otherwise never reached, depending on the defined step size. In doing so, the task can also change for a short time, since in each case it is quickly checked whether the new solution space is relevant.

For example, if a potentially dangerous but unidentifiable animal is detected from the input values, for which neither the first nor the second unit can find a matching image pattern, the system can now jump to a noise analysis by a modulated step size (e.g., stochastically induced), where it finds a matching noise recorded from the unidentifiable animal. Now the second unit, modulated in this way, can check whether the solution found can be applied to the previously unclassifiable images, which corresponds to an associative performance.

Similarly, the introduction of a projection level can emulate associative behavior in that now, for example, decisions (in the form of output values) can be compared with previous decisions and optionally also evaluated. Thus, instead of an abstract learning capability based on positive or negative rewards, the evaluation system is completed associatively. For example, if the system does not find better solutions in the jump domain, it can jump back to the domain of the previous best solution, which was determined by evaluations in the projection layer and optionally stored, and can start a new jump variant. In this way, for example, modulation by a first unit can always be performed from a suitable starting point found on the basis of the evaluation by the third unit.

As a possible application example, a personal AI system adapted to a user shall be considered. Ideally, such a system can develop intelligent behavior in the sense of hard artificial intelligence by coupling several artificial intelligence units that include, among other things, the described feedback by modulation as well as at least one evaluating unit with corresponding storage capabilities. Such a system should preferably be able to associate freely and classify problems independently. In addition, user-specific behavior should be possible, so that the AI system can respond individually to a user, i.e. can in particular detect and/or learn which interests, idiosyncrasies, moods, emotions, character traits and which level of knowledge the user has.

In the process, such and other externally collected data can be added to the system. Updates to the overall system are also possible, for example to change the rating systems or classifications within certain limits. Preferably, however, mechanisms are in place to completely prevent data from being exported from the system, especially since it operates on a very personal level. Personal data should therefore not be leaked to the outside and optionally not be accessible. For example, in this context, it may also be envisaged that the AI system operates primarily offline, i.e. without connection to external communication networks or other interfaces. For updating the system or for loading background knowledge and other data, a time-limited, secure connection can then be established, which can be completely controlled by the user, for example. Sources of the added data can be specified, for example, and the user can be given a choice of whether to agree to the connection.

An initial training phase for the system may be provided, in which a learning communication with an external person, a predefined training data set and/or data not originating from the actual user of the system takes place. This training phase can serve to provide a general basic setting for topics, knowledge, experience and expertise in order to later only have to resort to external data in special cases. A predefined communication character can also be set as well as an initial depth of learning processes and associations for a general state. Furthermore, problem recognition and appropriate reactions to situations as well as associative communication processes can be trained in the training phase.

After completion of this initial training phase, which can be carried out by the manufacturer, for example, a second training phase can be carried out by a user. Here, for example, the time parameters can now be set to the user (synchronization). The previously initially set communication character may be adapted to the user (by mirroring or complementing) by learning and adapting the system from coupled networks. Similarly, the character traits and interests previously set for a general user can now be adapted to the specific end user. Furthermore, in exemplary embodiments, particularly those that include visual evaluation, the projection plane may generate and display on a screen a current image of its state. This superimposed image then allows evaluation by an external user or trainer during a work phase, and in particular during the training phase, who can use it to determine how the system approximately assesses the current situation. In this way, it is possible to see at an early stage how the system is working or, if necessary, to intervene to correct or modify certain aspects and thus speed up the training phase.

After these training phases, the system is preferably ready for use. However, supplementary training phases can also be used later.

Depending on the embodiment, the AI system may have different interfaces to register environmental conditions and actions performed by the user, as well as emotional and mental states of the user. Various sensors may be used for this purpose, such as cameras, microphones, motion sensors, infrared sensors, "artificial noses", ultrasonic sensors, and any others. These may be arranged in suitable mobile or static objects individually, distributed and/or combined to provide the most comprehensive analysis possible. In addition, other interfaces may be provided through which the AI system can communicate with the user, such as speakers for a voice output or screens and other display means for visual displays and text representations.

In one possible embodiment, an object is provided in which such an AI system is integrated for a user. This may be a mobile object, such as a technical device (e.g. smartphone), but in particular also a furnishing object or an object of daily use, such as a lamp, a vase, a screen, a mirror or other objects which already occupy a fixed place in a home. The task of the system is to be an artificial personal intelligent companion for the user person. The system establishes the identity of the user and communicates with him, for example, by means of speech and/or image, if it is a screen or a projection is installed in the room. Accordingly, the output is connected to an interface (e.g. speaker, screen, projector).

Based on the inventive elements described above, the system can classify situations, bring in stored and learned knowledge and associate. The aim is to provide inspiration, to give suggestions, to bridge loneliness and mood lows of the user, to act as a coach or also as a professional advisor/problem solver. Areas of application include use as a leisure companion (helps with boredom, gives impulses for conversation, entertains people, gives life help); as an inspirer who gives intellectual, scientific, artistic impulses; as a coach or advisor to provide psychological or intellectual support, especially for mentally ill people; as an advisor for various everyday situations (fashion, hygiene, health, duties, care); as a personal secretary, whereby an extensive knowledge database can be created and used; as a play partner for the most diverse games; and others.

In particular, such a system can adapt to the user both in the short term, for example to a current mood, and in the long term, for example to the character type of the user. Among other things, information processed via the projection plane and subsequently stored in a long-term memory can be used for this purpose. Ideally, the system can be equipped with codes, biometric user recognition (image, voice, fingerprint, tone of voice or other characteristics) and other access control options for this purpose.

Preferably, such a system and the described method steps can implement a moral-ethical system. For example, the personal intelligent companion can encourage satisfying and useful actions for the user and his environment; it can draw attention to moral-ethical problems adapted to the type, character situation and mood of the user and, for example, propagate certain virtues (helpfulness, generosity, kindness, courage, wisdom).

Through appropriate boundary conditions in the third, evaluating unit, the system can be set up in such a way that it avoids harm, pain and strain, not only for the user but for all people affected by his or her decisions. In the case of expected serious wrong decisions, a personal attendant can start a discussion, especially arguing about the consequences of certain courses of action and offering constructive suggestions for alternatives. Preference is not given to prescribing actions, but to ideals of how actions should or could be. The personal attendant can identify dilemma situations and point them out to the user, while also looking for alternative solutions or the most favorable solution available. In particular, in the context of artistic works of the user, a personal intelligent companion offers the possibility to support, solely via pre-programmed and learned evaluations. In this context, considerations can already be adapted to the user. The associative ability of the system plays an essential role here.

As a further example of an embodiment, an "intelligent mirror" is described. There is often already a mirror provided in the entrance area or the bathroom area. The input and output interfaces already described in the previous general example, such as various sensors, can be integrated in a mirror in a simple manner. By using an object that a user passes briefly but frequently, a variety of possibilities can be implemented in such an AI system.

For example, suitable cameras, microphones, motion detectors, ultrasonic sensors, artificial noses, infrared sensors and others can be used to collect a variety of information about the user and prevailing situations and user habits without having to actively enter this information. Especially in an entrance area, an entrance and exit control can also be implemented.

In this way, an intelligent AI system can alert the user to clothing problems and provide clothing recommendations, for example; it can indicate the expected weather and necessary utensils if it detects that they are missing. Items carried by a user can be recorded and recognized. If necessary, questions can be clarified in a dialogue with the user (via speech or other input means), e.g. whether something is needed, has been forgotten or has been lost.

Comments recorded by microphones can also be included, so that the user can, for example, actively support these processes by commenting on situations or objects or actively pointing them out for recording. After some time, the AI system can know in this way almost all objects, items of clothing and their whereabouts in the apartment. If something is being searched for, or if the user has a question about their clothing, food inventory, book inventory, etc., the system can help with hints. For example, the user can be told that he was wearing glasses when he entered the apartment, and it can be concluded that the glasses must be inside the apartment.

Via a dialogue, appointment calendars, lists and other support aids for daily life can also be managed by the AI system. The system is therefore also of particular use for old and sick people or generally people who are restricted in some way in their everyday life.

By suitable evaluation of detected data, e.g. a facial expression recognition and an evaluation of the voice pitch or further data, the system can detect the mood of the user in the short term and, based on this, also provide corresponding indications, e.g. if someone wants to start a long journey in a hectic manner. For example, the detected mood may be included in the evaluation performed by the evaluating third neural network in the above embodiment examples.

In this context, the detection options as well as the dialogues are not necessarily bound to the object, i.e. in this case the smart mirror. Therefore, in order to prevent a user from having to engage in prolonged conversations with the AI system in an unsuitable location, the system may initiate or continue the dialogue with the user via loudspeakers, microphones and other devices distributed at appropriate locations in an apartment. Also, the components of the AI system itself may be distributed across multiple modules and may be interconnected, for example, via suitable wireless or wired communication interfaces.

For all AI systems presented here, it should preferably apply that the collected and stored data, in particular the personal data, are strictly protected. For this purpose, identification systems can also be integrated which can reliably identify the user from images, sound, but also from movement characteristics, an evaluation of speech emphasis or any other biometric characteristics. This can prevent personal information from being disclosed to a guest or other unauthorized person in the dialogue.

Other possible embodiments, which may be implemented individually or in any combination with each other and with the foregoing embodiments, are further summarized below:

For example, according to one embodiment, a method may be implemented in a system of at least two artificial intelligence units comprising inputting input values to at least a first artificial intelligence unit and a second artificial intelligence unit, whereupon first output values of the first artificial intelligence unit are obtained. Based on the output values of the first artificial intelligence unit, one or more modulation functions may be formed, which are then applied to one or more parameters of the second artificial intelligence unit. In this regard, the one or more parameters may be parameters that affect or influence the processing of input values and the obtaining of output values in the second artificial intelligence unit in some manner. Furthermore, output values of the second artificial intelligence unit are obtained. These may represent, for example, modulated output values of the second unit.

In this way, two artificial intelligence units are coupled together without using direct feedback of input or output values. Instead, one of the units is used to influence the function of the second unit by modulating certain functionally relevant parameters, resulting in a novel coupling that leads to different results or output values than in conventional learning units. Moreover, by processing input values in two coupled units, a result can be obtained in a shorter time or with a more in-depth analysis than in conventional systems, so that the overall efficiency can be increased. In particular, a rapid classification of the problem at hand and consideration of rapid changes is achieved.

In an exemplary embodiment, at least one of the artificial intelligence units may comprise a neural network having a plurality of nodes, in particular one of the learning units to which the modulation functions are applied. In this case, the one or more parameters may be at least one of: a weighting for a node of the neural network, an activation function of a node, an output function of a node, a propagation function of a node. These are essential components of a neural network that determine how data is processed in the network. Instead of defining new weights or functions for the nodes, the modulation function can be used to superimpose existing self-learned and/or predefined functions of the modulated network, which is dependent on the results of the first artificial intelligence unit. Thereby, this application of modulation functions can in particular also take place outside a training phase of the networks and thus achieve an active coupling of two or more networks in the processing of input values.

According to an exemplary embodiment, each of the artificial intelligence units can be assigned a classification memory, wherein each of the artificial intelligence units performs a classification of the input values into one or more classes which are stored in the classification memory, wherein the classes are each structured in one or more dependent levels, and wherein a number of the classes and/or the levels in a first classification memory of the first artificial intelligence unit is smaller than a number of the classes and/or the levels in a second classification memory of the second artificial intelligence unit. By making the classification memories of two coupled artificial intelligence units asymmetric in this way, a parallel or also time-dependent alternating evaluation of the input values with different objectives can take place, e.g. a combination of a fast classification of the input values and a deep, slower analysis of the input values.

Alternatively or in addition to the asymmetric design of the classification memories, the complexity of the first and second artificial intelligence units may also be designed differently, so that, for example, a first artificial intelligence unit has a significantly lower degree of complexity than a second artificial intelligence unit. In this regard, for the case of neural networks, for example, a first neural network may have substantially fewer nodes and/or layers and/or edges than a second neural network.

In a possible embodiment, the application of the at least one modulation function may cause a time-dependent superposition of parameters of the second artificial intelligence unit, wherein the at least one modulation function may comprise one of the following features: a periodic function, a step function, a function with briefly increased amplitudes, a damped oscillation function, a beat function as superposition of several periodic functions, a continuously increasing function, a continuously decreasing function. Combinations or temporal sequences of such functions are also conceivable. In this way, relevant parameters of a learning unit can be superimposed in a time-dependent manner, so that, for example, the output values "jump" into search spaces due to the modulation, which would not be reached without the superimposition.

Optionally, the second artificial intelligence unit may comprise a second neural network having a plurality of nodes, wherein applying the at least one modulation function causes deactivation of at least a portion of the nodes. This type of deactivation may also be considered a "dropout" based on the output values of the first artificial intelligence unit, and may also provide for newly explored search regions in the classifications, as well as reduced computational overhead and thus accelerated execution of the method.

In exemplary embodiments, the method may further comprise determining a current dominant artificial intelligence unit in the system, and forming overall output values of the system from the output values of the current dominant unit. In this way, the two or more networks in the system may be meaningfully coupled and synchronized.

In this regard, for example, the first artificial intelligence unit may be determined to be the dominant unit at least until one or more output values of the second artificial intelligence unit are available. In this way, it can be ensured that the system is decision-safe at all times, i.e. that a reaction of the system is possible at all times (after a first run of the first artificial intelligence unit), even before a complete classification of the input values by all existing artificial intelligence units of the system has been performed.

In this context, it is also possible to further apply a comparison of the current input values with previous input values by at least one of the artificial intelligence units of the system, wherein, if the comparison results in a deviation that is above a predetermined input threshold, the first artificial intelligence unit is set as the dominating unit. In this way, it can be ensured that substantially changed input values (e.g. detection of a new situation by sensors) are immediately reacted to with a new evaluation of the input values.

Additionally or alternatively, a comparison of current output values of the first artificial intelligence unit with previous output values of the first artificial unit may further be made, wherein if the comparison results in a deviation that is above a predetermined output threshold, the first artificial intelligence unit is determined to be the dominant unit. By evaluating deviations in the output values, for example in the presence of deviating classes as a result in comparison to a previous run, changes in the input values can thus also be indirectly detected which have a certain significance and thus make a new classification meaningful.

In certain embodiments, the system may further comprise a timer storing one or more predetermined time periods associated with one or more of the artificial intelligence units, the timer being arranged to measure, for one of the artificial intelligence units at a time, the passage of the predetermined time period associated with that unit. Such an element forms a possibility to synchronize the different units of a system, for example, and to control when output values of a certain unit are expected or further processed. Thus, a timer can be used to define an adjustable latency period of the overall system within which a decision should be available as an overall output value of the system. This time may be, for example, a few ms, e.g. 30 or 50 ms, and may depend, inter alia, on the existing topology of the computing units and the computing units (processors or other data processing means) present.

Thereby, for example, the measuring of the assigned predetermined time period for one of the artificial intelligence units can be started as soon as this artificial intelligence unit is determined as the dominating unit. In this way, it can be ensured that a unit develops a solution within a predetermined time or, optionally, that the data processing is even aborted.

In one possible embodiment, the second artificial intelligence unit may be set as the dominant unit if a first time period in the timer predetermined for the first artificial intelligence unit has elapsed. This ensures that a reaction based on the first artificial unit is already possible before the input values are analyzed by further artificial intelligence units, while subsequently the data is analyzed in more detail by the second unit.

In any embodiments, the input values may include, for example, one or more of the following: measured values detected by one or more sensors, data detected by a user interface, data retrieved from a memory, data received via a communication interface, data output by a computing unit. Thus, it may be, for example, image data captured by a camera, audio data, position data, physical measurements such as velocities, distance measurements, resistance values, and generally any value captured by a suitable sensor. Similarly, data may be entered or selected by a user via a keyboard or screen, and optionally may be associated with other data such as sensor data.

It is understood that the examples described above may be combined in any way. For example, in any of the embodiments described, there may also be a timer as described in connection with FIG. 4 or FIG. 7. Similarly, in all of the examples, the learning units may include classification memories as described as an example in connection with FIG. 5 or FIG. 8. All these variants are again applicable to a coupling also of more than two or three artificial intelligence units.

The invention claimed is:

1. A method in a system of at least a first artificial intelligence unit, second artificial intelligence unit, and a third artificial intelligence unit comprising:

inputting one or more first input values to the first artificial intelligence unit to obtain one or more first output values, wherein the one or more first input values comprise at least one of sensor data, audio data, or image data;

forming a modulation function based on the one or more first output values of the first artificial intelligence unit or one or more third output values of the third artificial intelligence unit;

applying the modulation function to one or more parameters of the second artificial intelligence unit, wherein the second artificial intelligence unit comprises a larger number of nodes than the first artificial intelligence unit, and the one or more parameters comprise at least one of: a weighting for a node of the second artificial intelligence unit, an activation function of the node, an output function of the node, or a propagation function of the node;

inputting the one or more first input values to the second artificial intelligence unit to obtain one or more second output values;

at least temporarily storing situation data comprising at least one of the one or more first input values or the one or more second output values;

using the situation data as one or more third input values for the third artificial intelligence unit to obtain the one or more third output values; and checking whether the one or more second output values satisfy one or more predetermined conditions based on the one or more third output values, wherein at least one of the one or more first output values or the one or more second output values is used as one or more direct or indirect control signals for an actuator of an automated system, wherein (i) after the expiration of a first time period, the one or more first output values are used, or (ii) after the expiration of a second time period, which starts with the expiration of the first time period, the one or more second output values are used.

2. The method of claim 1, wherein the one or more second output values are discarded if the one or more second output values do not satisfy at least one of the one or more predetermined conditions.

3. The method of claim 1, further comprising:

deciding whether at least a portion of the situation data should be stored permanently; and p1 transferring the situation data to be stored permanently to a long-term memory.

4. The method of claim 3, wherein deciding whether to permanently store at least the portion of the situation data is dependent on whether the one or more second output values satisfy the one or more predetermined conditions.

5. The method of claim 1, wherein storing the situation data further comprises storing timing information for the one or more first input values or the one or more second output values.

6. The method of claim 5, wherein the timing information comprises one or more time intervals associated with the one or more first input values or the one or more second output values.

7. The method of claim 1, wherein the situation data is temporarily stored for at least a predetermined period of time, and wherein at least one of the first artificial intelligence unit, the second artificial intelligence unit, or the third artificial intelligence unit is adapted to set or change the predetermined period of time.

8. The method of claim 1, comprising comparing the one or more second output values with the situation data.

9. The method of claim 1, wherein;
   (i) each of the first artificial intelligence unit, the second artificial intelligence unit, and the third artificial intelligence unit is assigned a respective classification memory,
   ii) each of the first artificial intelligence unit, the second artificial intelligence unit, and the third artificial intelligence unit, when generating one or more output values, classifies one or more input values into one or more classes (K1, . . . Kj, Km, Kn) which are stored in the respective classification memory, the one or more classes each being structured in one or more dependent levels, and
   iii) the second artificial intelligence unit is associated with a larger number of classes or a larger number of depending levels than the first artificial intelligence unit or the third artificial intelligence unit.

10. The method of claim 1, wherein one or more of the first artificial intelligence unit, the second artificial intelligence unit, and the third artificial intelligence unit comprise a neural network.

11. A system comprising:
   at least a first artificial intelligence unit, second artificial intelligence unit, and a third artificial intelligence unit;
   means for acquiring one or more first input values; and
   at least one user interface for outputting one or more total output values to a user, wherein the one or more total output values are formed based on one or more output values from one or more of the first artificial intelligence unit, the second artificial intelligence unit, and the third artificial intelligence unit by:
   inputting the one or more first input values to the first artificial intelligence unit to obtain one or more first output values, wherein the one or more first input values comprise at least one of sensor data, audio data, or image data;
   forming a modulation function based on the one or more first output values of the first artificial intelligence unit or one or more third output values of the third artificial intelligence unit;
   applying the modulation function to one or more parameters of the second artificial intelligence unit, wherein the second artificial intelligence unit comprises a larger number of nodes than the first artificial intelligence unit, and the one or more parameters comprise at least one of: a weighting for a node of the second artificial intelligence unit, an activation function of the node, an output function of the node, or a propagation function of the node;
   inputting the one or more first input values to the second artificial intelligence unit to obtain one or more second output values;
   at least temporarily storing situation data comprising at least one of the one or more first input values or the one or more second output values;
   using the situation data as one or more third input values for the third artificial intelligence unit to obtain the one or more third output values; and
   checking whether the one or more second output values satisfy one or more predetermined conditions based on the one or more third output values, wherein at least one of the one or more first output values or the one or more second output values is used as one or more direct or indirect control signals for an actuator of an automated system, wherein (i) after the expiration of a first time period, the one or more first output values are used, or (ii) after the expiration of a second time period, which starts with the expiration of the first time period, the one or more second output values are used.

12. The system of claim 11, further comprising:
   a projection plane adapted to at least temporarily store the situation data.

13. The system of claim 12, further comprising at least one sensor element or at least one detection unit, wherein the one or more first input values comprise one or more values detected by the at least one sensor element or the at least one detection unit.

14. The system of claim 12, further comprising a storage element of the projection plane in which the situation data is stored.

15. The system of claim 12, further comprising at least one output module for outputting the one or more total output values to the user, wherein the at least one output module comprises at least one of: a display screen, a touch screen, a speaker, or a projection module.

16. The system of claim 12, wherein each of the first artificial intelligence unit, the second artificial intelligence unit, and the third artificial intelligence unit is assigned a respective classification memory, each of the first artificial intelligence unit, the second artificial intelligence unit, and the third artificial intelligence unit is arranged to perform a classification of one or more input values into one or more classes (K1, . . . Kj, Km, Kn) which are stored in the respective classification memory, the one or more classes each being structured in one or more dependent levels, and the second artificial intelligence unit is associated with a larger number of classes or a larger number of depending levels than the first artificial intelligence unit or the third artificial intelligence unit.

17. The system of claim 12, wherein one or more of the first artificial intelligence unit, the second artificial intelligence unit, and the third artificial intelligence unit comprise a neural network.

\* \* \* \* \*